(12) United States Patent
Katoh et al.

(10) Patent No.: US 10,939,068 B2
(45) Date of Patent: Mar. 2, 2021

(54) IMAGE CAPTURING DEVICE, IMAGE CAPTURING SYSTEM, IMAGE PROCESSING METHOD, AND RECORDING MEDIUM

(71) Applicants: Takamichi Katoh, Tokyo (JP); Yoshinaga Kato, Kanagawa (JP)

(72) Inventors: Takamichi Katoh, Tokyo (JP); Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/820,760

(22) Filed: Mar. 17, 2020

(65) Prior Publication Data

US 2020/0304751 A1 Sep. 24, 2020

(30) Foreign Application Priority Data

Mar. 20, 2019 (JP) ................................ 2019-052601
Mar. 6, 2020 (JP) ................................ 2020-039043

(51) Int. Cl.
*H04N 5/92* (2006.01)
*H04N 5/232* (2006.01)
(Continued)

(52) U.S. Cl.
CPC .......... *H04N 5/92* (2013.01); *H04N 5/23238* (2013.01); *H04N 5/917* (2013.01); *H04N 7/04* (2013.01)

(58) Field of Classification Search
None
See application file for complete search history.

(56) References Cited

U.S. PATENT DOCUMENTS

2002/0075258 A1* 6/2002 Park .................... H04N 17/002
 345/419
2002/0152557 A1* 10/2002 Elberbaum ............ H04N 7/181
 8/405
(Continued)

FOREIGN PATENT DOCUMENTS

JP 2006-340091 12/2006
JP 2006340091 A * 12/2006
(Continued)

OTHER PUBLICATIONS

U.S. Appl. No. 16/654,011, filed Oct. 16, 2019 Yoshiyuki Toda, et al.
(Continued)

*Primary Examiner* — Stuart D Bennett
(74) *Attorney, Agent, or Firm* — Oblon, McClelland, Maier & Neustadt, L.L.P.

(57) ABSTRACT

An image capturing device, image capturing system, and image processing method, each of which: obtains a video image of an object; converts a wide-angle video image to generate a low-definition, wide-angle image; applies projection transformation to a part of the wide-angle video image to generate a high-definition, narrow-angle video image in different projection; combines each frame of the low-definition, wide-angle video image and a corresponding frame of the high-definition, narrow-angle video image, into one frame data while reducing a resolution of each video image, to generate a combined video image; transmits the combined video image for display at a communication terminal; in response to a request from the communication terminal, applies projection transformation to a part of a frame of the wide-angle video image to generate an ultra-high-definition, narrow-angle still image in different projec-
(Continued)

tion; and transmits the ultra-high-definition, narrow-angle still image for display at the communication terminal.

11 Claims, 27 Drawing Sheets

(51) Int. Cl.
*H04N 5/917* (2006.01)
*H04N 7/04* (2006.01)

(56) References Cited

U.S. PATENT DOCUMENTS

| | | | | |
|---|---|---|---|---|
| 2010/0103291 A1* | 4/2010 | Koyama | ............... | H04N 5/2628 348/240.3 |
| 2010/0238327 A1* | 9/2010 | Griffith | ................. | H04N 5/232 348/240.99 |
| 2012/0007866 A1* | 1/2012 | Tahan | ................... | G06T 3/0025 345/428 |
| 2015/0145950 A1* | 5/2015 | Murphy | ............. | H04N 5/23238 348/36 |
| 2015/0207999 A1* | 7/2015 | Han | ..................... | H04N 5/2621 348/240.3 |
| 2017/0324899 A1* | 11/2017 | Ohba | .................. | H04N 5/2258 |
| 2017/0330337 A1* | 11/2017 | Mizutani | ................. | G06T 5/006 |
| 2018/0181358 A1 | 6/2018 | Asai et al. | | |
| 2019/0080197 A1 | 3/2019 | Kato | | |
| 2019/0206075 A1* | 7/2019 | Ganguli | .................. | G06T 7/593 |
| 2019/0306175 A1 | 10/2019 | Kato et al. | | |
| 2019/0306334 A1 | 10/2019 | Katoh et al. | | |
| 2020/0043188 A1 | 2/2020 | Kato | | |
| 2020/0096334 A1* | 3/2020 | Ohtomo | ................. | G01C 11/14 |

FOREIGN PATENT DOCUMENTS

| | | |
|---|---|---|
| JP | 2011-041153 | 2/2011 |
| JP | 2018-110375 | 7/2018 |
| WO | WO 2018/124267 A1 | 7/2018 |

OTHER PUBLICATIONS

U.S. Appl. No. 16/675,977, filed Nov. 6, 2019 Yoshinaga Kato, et al.
U.S. Appl. No. 16/728,156, filed Dec. 27, 2019 Keiichi Kawaguchi.
U.S. Appl. No. 16/699,260, filed Nov. 29, 2019 Yoshinaga Kato.
Extended European Search Report dated Jul. 15, 2020 in European Patent Application No. 20164281.6, 11 pages.
Chang, H., et al., "Panning and Zooming High-Resolution Panoramas in Virtual Reality Devices", Proceedings of the 30th Annual ACM Symposium on User Interface Software and Technology, Oct. 22, 2016, XP055421218, pp. 279-288.

* cited by examiner

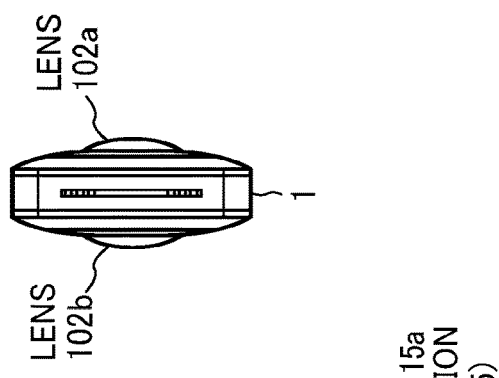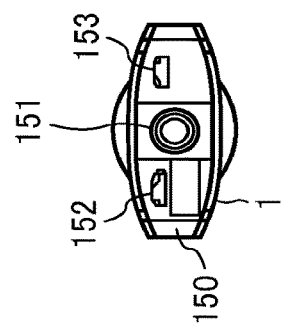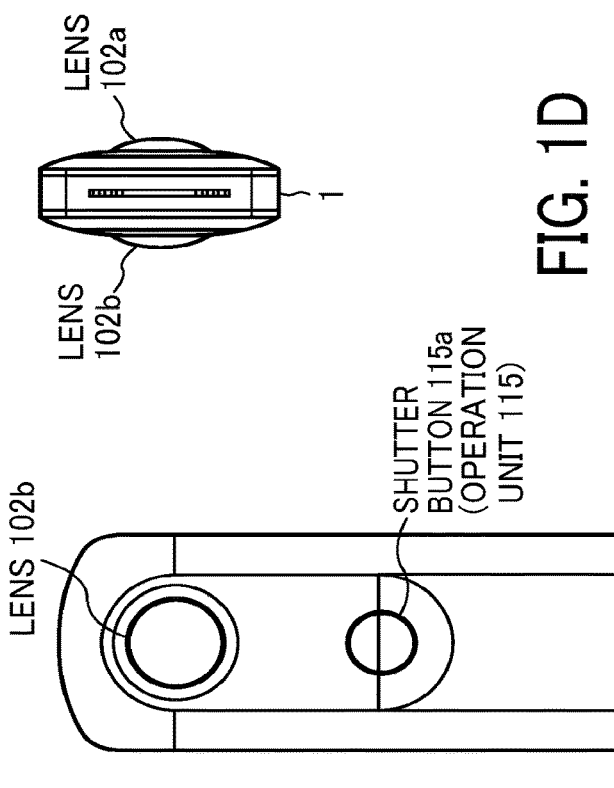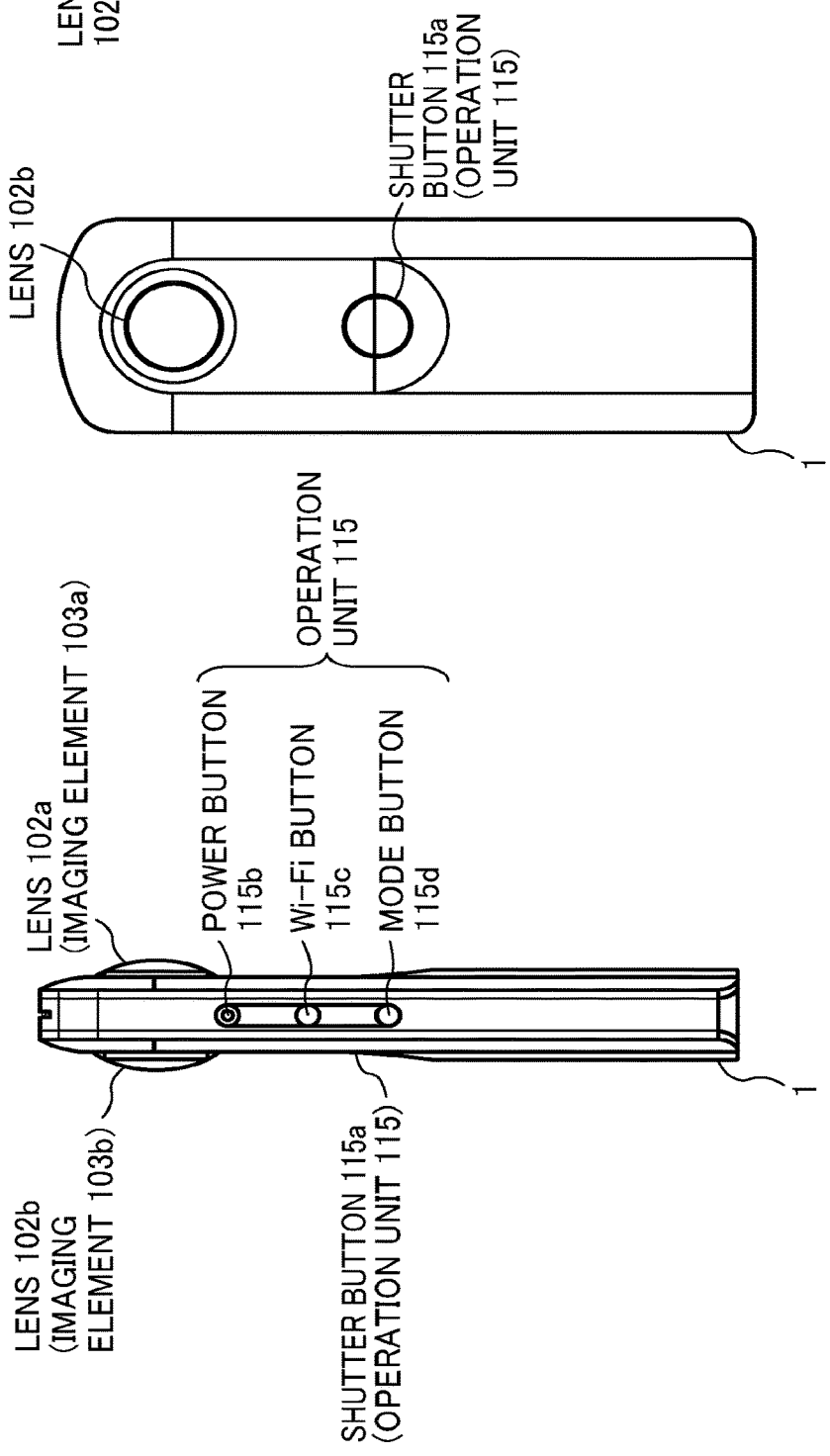

HEMISPHERICAL IMAGE (FRONT)

HEMISPHERICAL IMAGE (BACK)

CAPTURED IMAGE (EQUIRECTANGULAR PROJECTION IMAGE EC)

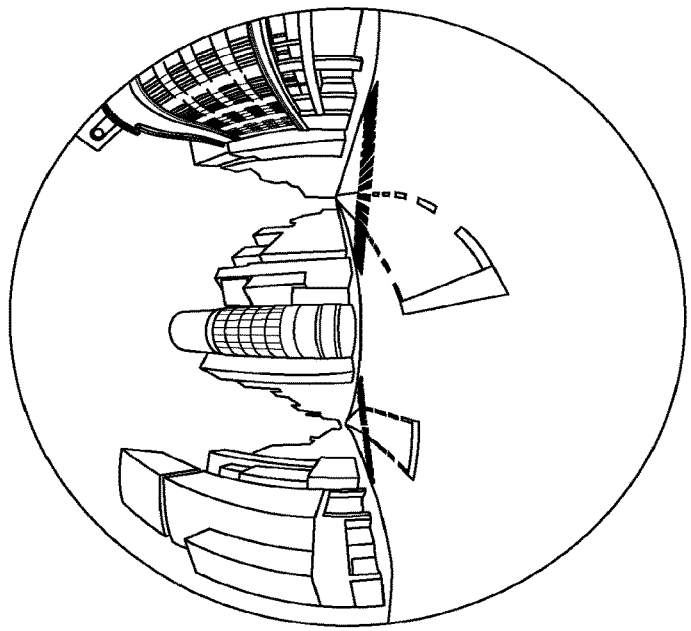
FIG. 4A
EQUIRECTANGULAR PROJECTION IMAGE EC
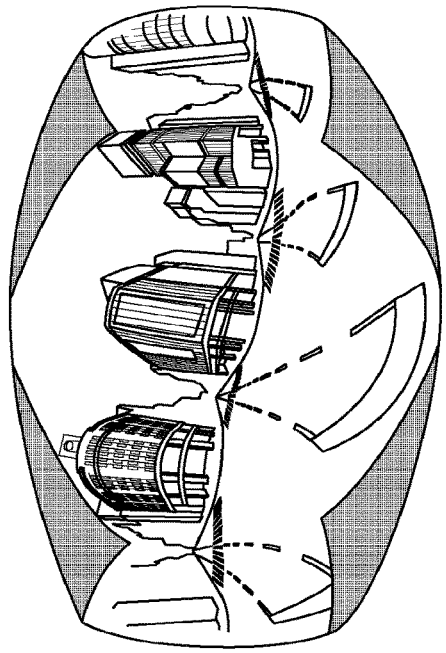
FIG. 4B
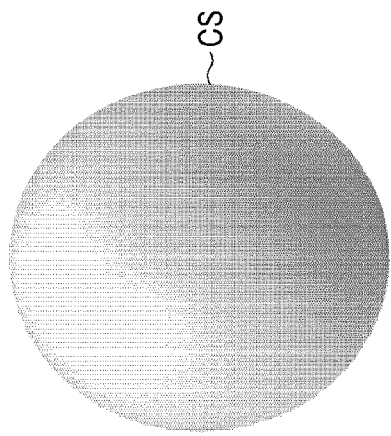
SPHERICAL IMAGE CE

VIRTUAL CAMERA IC
SPHERE CS
VIEWABLE-AREA IMAGE Q (VIEWABLE AREA T)

VIEWABLE-AREA IMAGE Q

VERTICAL CAMERA IC
FRONT FACE

|  | W | H | W' | H' | AH (THRESHOLD) | AV (THRESHOLD) |
|---|---|---|---|---|---|---|
| CONFIGURATION 1 | 4000 | 2000 | 1920 | 1080 | 172.8 | 48.6 |
| CONFIGURATION 2 | 4000 | 2000 | 1280 | 720 | 115.2 | 32.4 |
| CONFIGURATION 3 | 8000 | 4000 | 1920 | 1080 | 86.4 | 24.3 |
| CONFIGURATION 4 | 8000 | 4000 | 1280 | 720 | 57.6 | 16.2 |

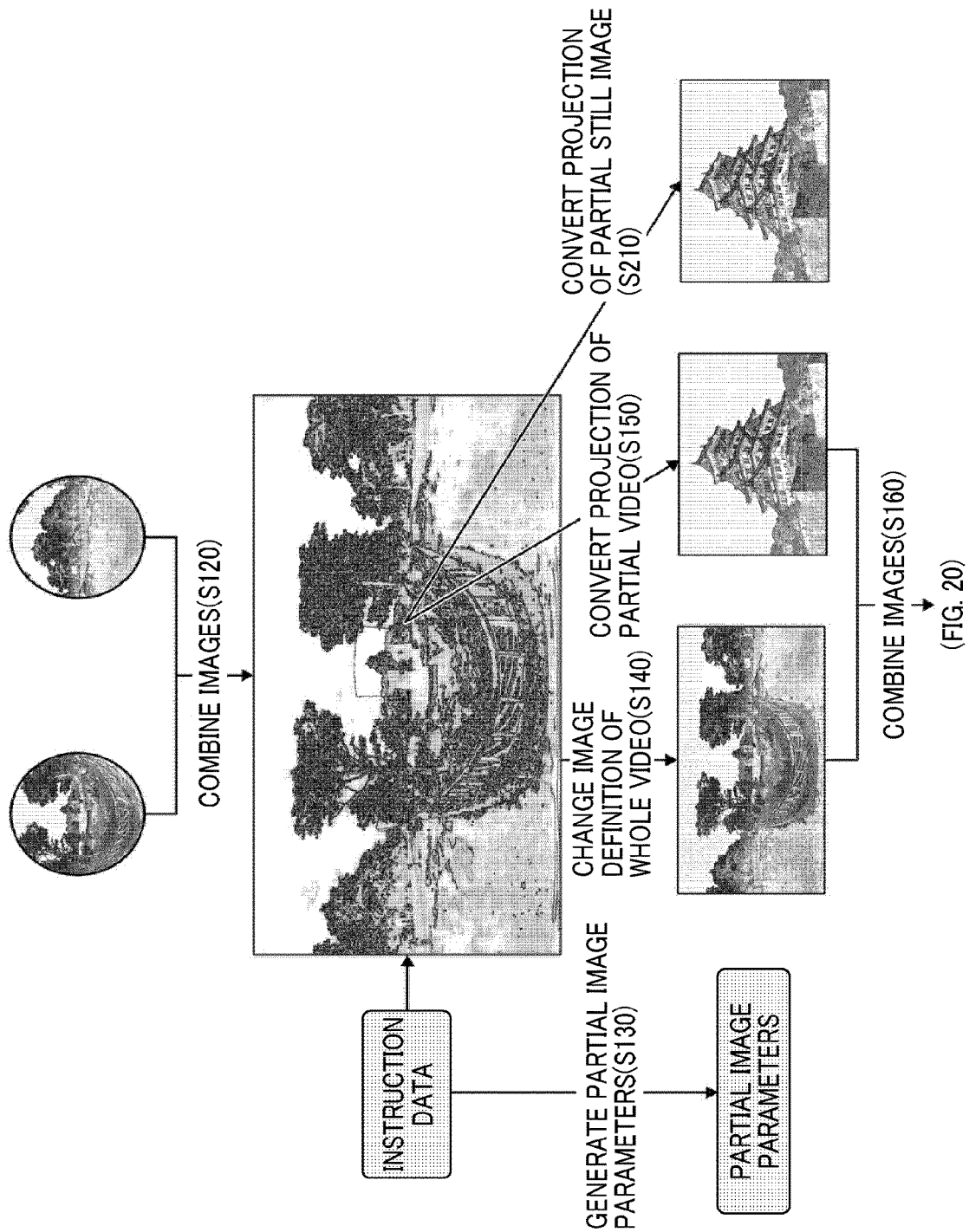

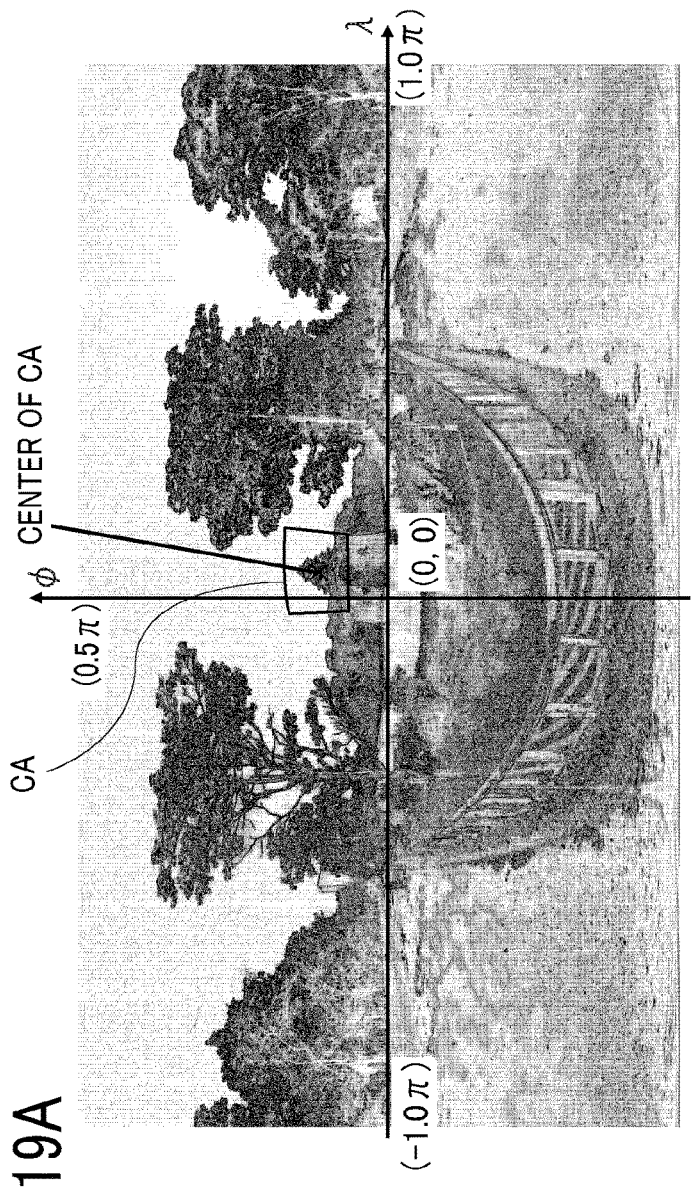
FIG. 19A
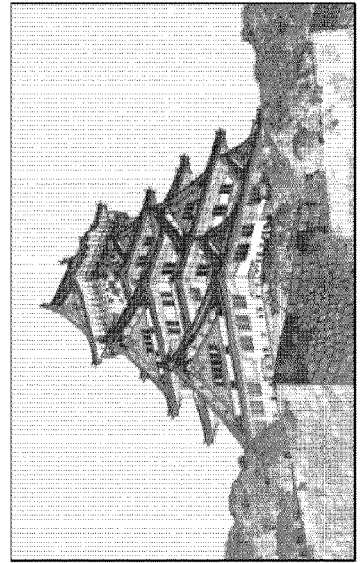
FIG. 19C
| ITEM | VALUE |
|---|---|
| POINT OF GAZE | (aa,ea) |
| ANGLE OF VIEW | α |
| ASPECT RATIO | w/h |
FIG. 19B

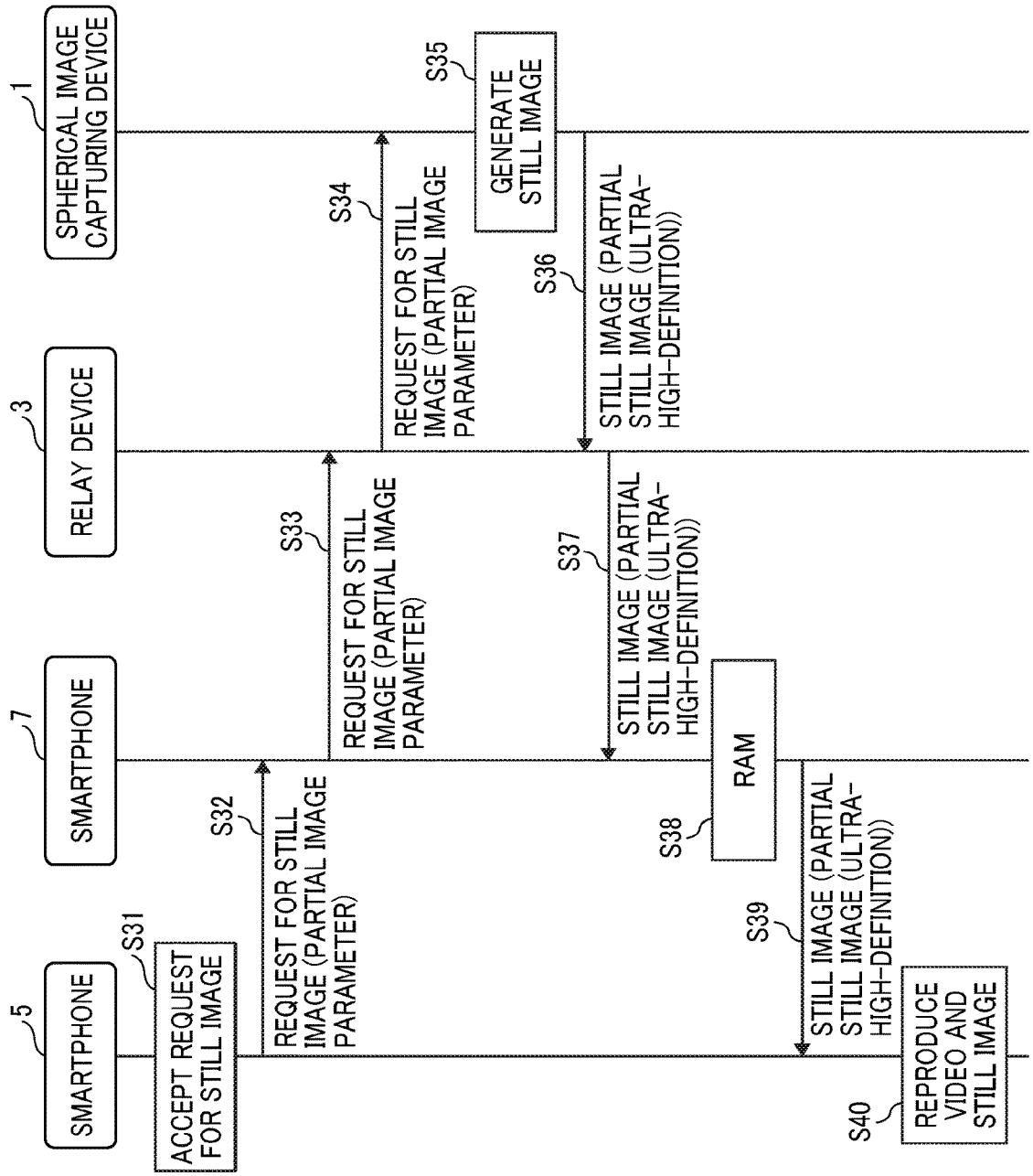

IMAGE CAPTURING DEVICE, IMAGE CAPTURING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2019-052601, filed on Mar. 20, 2019, and 2020-039043, filed on Mar. 6, 2020, in the Japan Patent Office, the entire disclosure of which is hereby incorporated by reference herein.

BACKGROUND

Technical Field

The present invention relates to an image capturing device, image capturing system, image processing method, and a recording medium.

Description of the Related Art

The image capturing device transmits a wide-angle image, which has been captured using such as a fish-eye lens, for example, to a smart phone operated by a user who views the image using a viewer. In order to reduce a size of data for distribution through a network, the image capturing device transmits a whole image having an image definition lower than that of the captured wide-angle image, and a partial image of an area of interest that is higher in image definition than that of the whole image. At the smart phone, the high-definition, partial image is superimposed on the whole image for display.

However, if the whole image and the partial image are transmitted as video image, further reduction in data size for transmission is desired.

SUMMARY

Example embodiments include an image capturing device, an image capturing system, an image processing method, and a recording medium.

The image capturing device includes an imaging device that captures a video image of an object, and circuitry. The circuitry: converts a wide-angle video image from an ultra-high-definition image into a low definition image to generate a low-definition, wide-angle image, the wide-angle video image being an entire or a part of the captured video image; applies projection transformation to a part of the wide-angle video image to generate a high-definition, narrow-angle video image in different projection, the high-definition, narrow-angle video image having an image definition higher than that of the low-definition, wide-angle video image; combines each frame of the low-definition, wide-angle video image and a corresponding frame of the high-definition, narrow-angle video image, into one frame data while reducing a resolution of each video image, to generate a combined video image; transmits the combined video image for display at a communication terminal, the high-definition, narrow-angle video image to be superimposed on the low-definition, wide-angle video image; in response to a request from the communication terminal, apply projection transformation to a part of a frame of the wide-angle video image to generate an ultra-high-definition, narrow-angle still image in different projection, the ultra-high-definition, narrow-angle still image having an image definition higher than that of the high-definition, narrow-angle video image; and transmits the ultra-high-definition, narrow-angle still image for display at the communication terminal, the ultra-high-definition, narrow-angle still image to be displayed in place of the high-definition, narrow-angle video image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A to 1D (FIG. 1) are respectively a right side view, a rear view, a plan view, and a bottom view of a spherical image capturing device, according to embodiments;

FIG. 4A and FIG. 4B (FIG. 4) are views respectively illustrating the image in equirectangular projection covering a surface of a sphere, and a spherical image, according to embodiments;

FIG. 18 is a conceptual diagram illustrating image processing performed by the spherical image capturing device, with images being generated, according to the embodiment;

FIGS. 19A, 19B, and 19C (FIG. 19) are an illustration for explaining partial image parameters;

FIG. 26 is a sequence diagram illustrating operation of generating and reproducing a partial still image, according to the embodiment.

Figure 2:
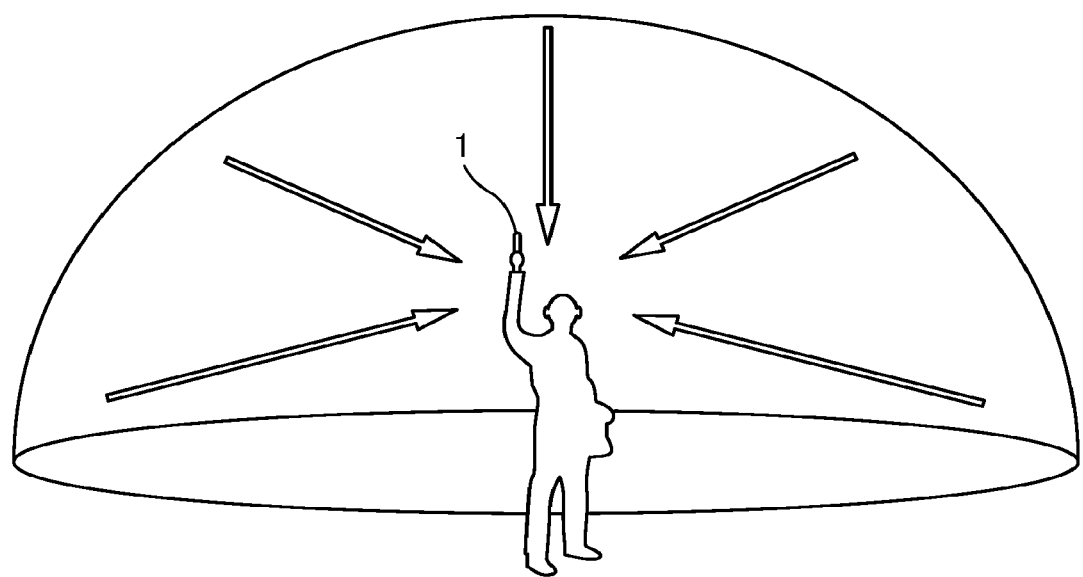
FIG. 2 is an illustration for explaining how a user uses the spherical image capturing device, according to embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

<Overview>

Referring to FIGS. 1 to 6, operation of generating a spherical image is described according to one or more embodiments.

First, referring to FIGS. 1A to 1D, an external view of a spherical image capturing device 1, is described. The spherical image capturing device 1 is a digital camera for capturing images from which a 360-degree spherical image is generated. FIGS. 1A to 1D are respectively a right side view, a rear view, a plan view, and a bottom view of the spherical image capturing device 1.

The spherical image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the spherical image capturing device 1 further includes a shutter button 115a on a rear side of the spherical image capturing device 1, which is opposite of the front side of the spherical image capturing device 1. As illustrated in FIG. 1A, the left side of the spherical image capturing device 1 is provided with a power button 115b, a Wireless Fidelity (Wi-Fi) button 115c, and an image capturing mode button 115d. Any one of the shutter button 115a, the power button 115b and the Wi-Fi button 115c switches between ON and OFF, according to selection (pressing) by the user. The image capturing mode button 115d switches between a still-image capturing mode, a video image capturing mode, and a video image distribution mode, according to selection (pressing) by the user. The shutter button 115a, power button 115b, Wi-Fi button 115c, and image capturing mode button 115d are an example of an operation unit 115. The operation unit 115 is any section that receives a user instruction, and is not limited to the above-described buttons or switches.

As illustrated in FIG. 1D, the spherical image capturing device 1 is provided with a tripod mount hole 151 at a center of its bottom face 150. The tripod mount hole 151 receives a screw of a tripod, when the spherical image capturing device 1 is mounted on the tripod. The bottom face 150 of the spherical image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Next, referring to FIG. 2, a description is given of a situation where the spherical image capturing device 1 is used. FIG. 2 illustrates an example of how the user uses the spherical image capturing device 1. As illustrated in FIG. 2, for example, the spherical image capturing device 1 is used for capturing objects surrounding the user who is holding the spherical image capturing device 1 in his or her hand. The imaging elements 103a and 103b illustrated in FIGS. 1A to 1D capture the objects surrounding the user to obtain two hemispherical images.

Figure 3A:
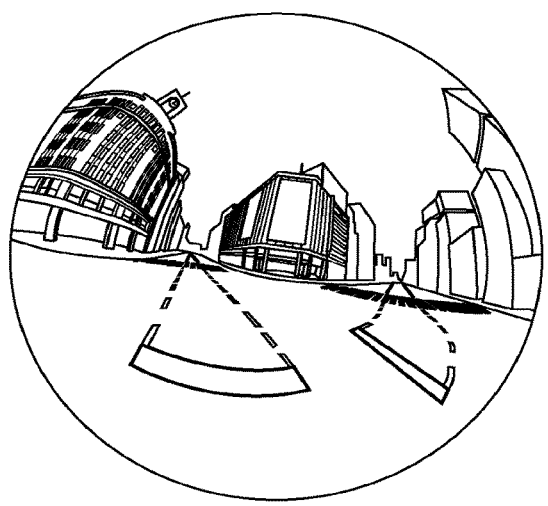
FIGS. 3A, 3B, and 3C (FIG. 3) are views illustrating a front side of a hemispherical image, a back side of the hemispherical image, and an image in equirectangular projection, respectively, captured by the spherical image capturing device, according to embodiments.
Figure 3B:
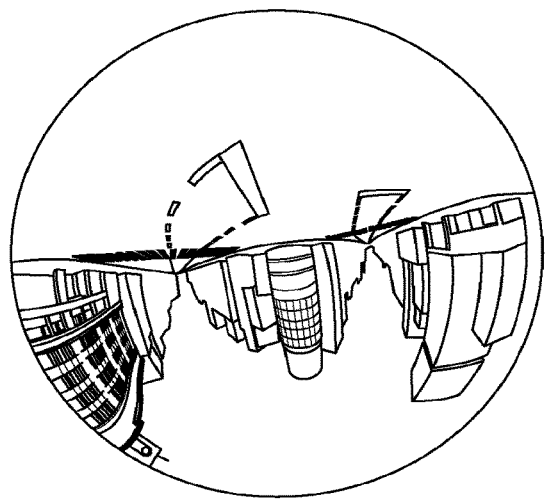
Figure 3C:
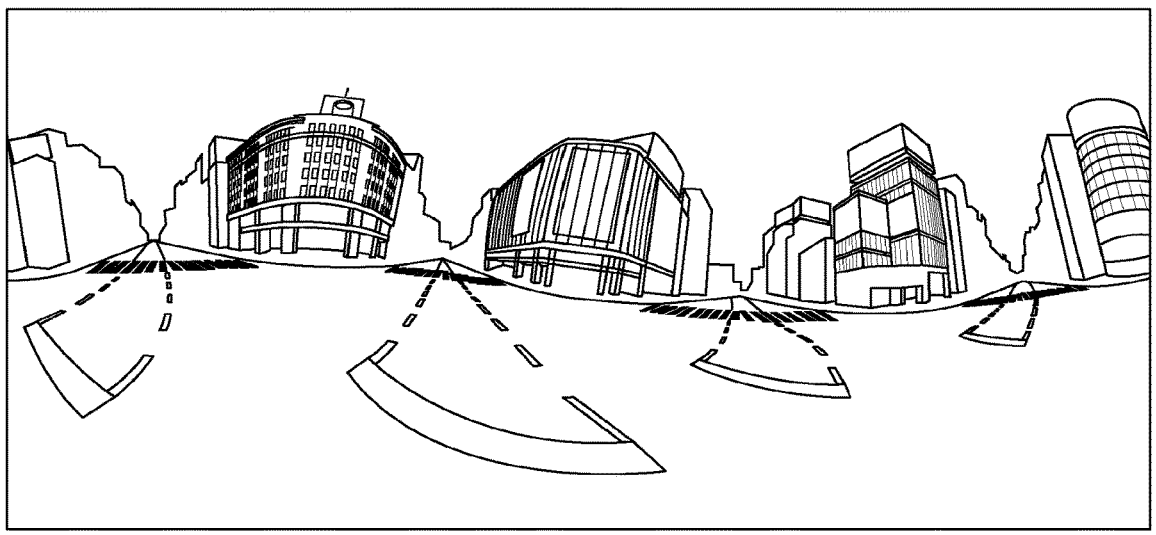

Next, referring to FIGS. 3A to 3C and FIGS. 4A and 4B, a description is given of an overview of an operation of generating an equirectangular projection image EC and a spherical image CE from the images captured by the spherical image capturing device 1. FIG. 3A is a view illustrating a hemispherical image (front side) captured by the spherical image capturing device 1. FIG. 3B is a view illustrating a hemispherical image (back side) captured by the spherical image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the spherical image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a video image, unless it is explicitly stated.

Figure 5:
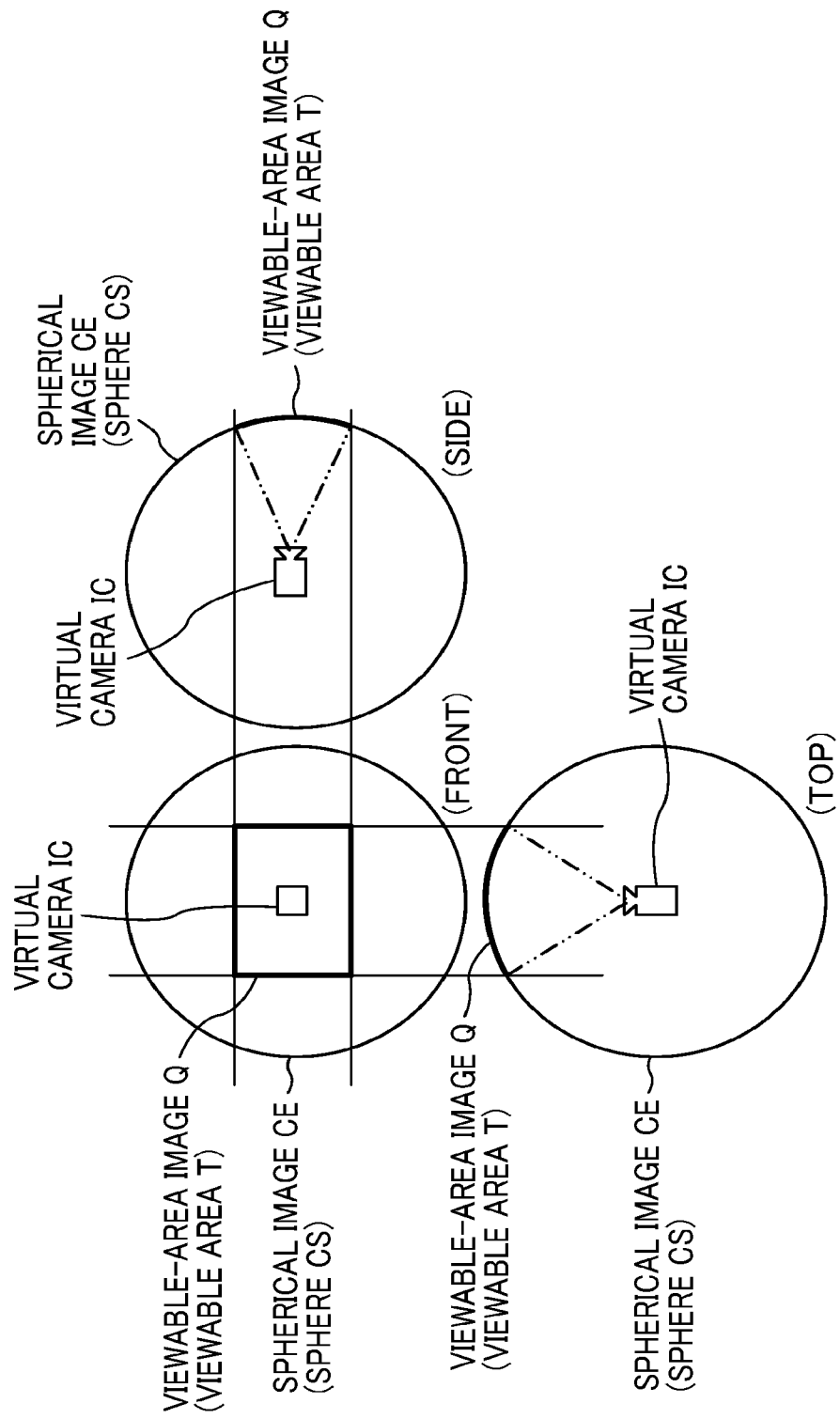
FIG. 5 is a view illustrating positions of a virtual camera and a viewable area in a case in which the spherical image is represented as a three-dimensional solid sphere according to embodiments.

Since the spherical image CE is an image attached to the sphere surface, as illustrated in FIG. 5B, a part of the image may look distorted when viewed from the user, providing a feeling of strangeness. To resolve this strange feeling, an image of a viewable area, which is a part of the spherical image CE, is displayed as a flat image having fewer curves. The viewable area is, for example, a part of the spherical image CE that is viewable by the user. In this disclosure, the image of the viewable area is referred to as a "viewable-area image" Q. Hereinafter, a description is given of displaying the viewable-area image Q with reference to FIG. 5 and FIGS. 6A and 6B.

Figure 6A:
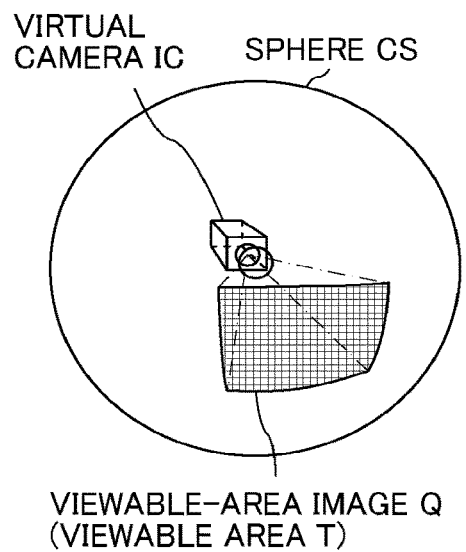
FIGS. 6A and 6B (FIG. 6) are respectively a perspective view of FIG. 5, and a view illustrating an image of the viewable area on a display, according to embodiments.
Figure 6B:
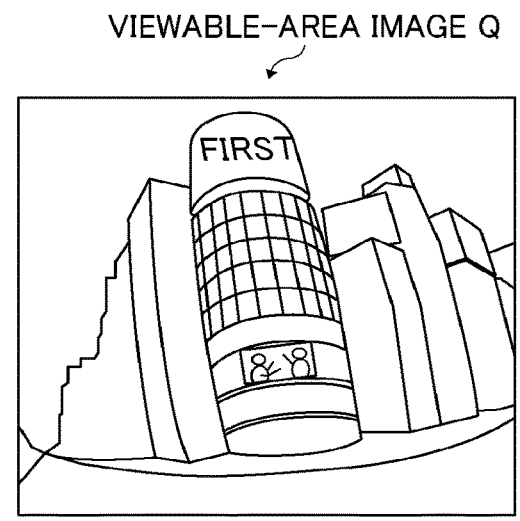

FIG. 5 is a view illustrating positions of a virtual camera IC and a viewable area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the viewable-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The viewable area T in the spherical image CE is an imaging area of the virtual camera IC. Specifically, the viewable area T is specified by viewable-area information indicating an imaging direction and an angle of view of the virtual camera IC in a three-dimensional virtual space containing the spherical image CE. That is, the zooming of the viewable area T is determined by expanding or contracting a range (arc) of the angle of view α. In addition, zooming in the viewable area T can also be determined by bringing the virtual camera IC closer to or away from the spherical image CE. The viewable-area image Q is an image of the viewable area T, in the spherical image CE.

The viewable-area image Q, which is an image of the viewable area T illustrated in FIG. 6A, is displayed on a display as an image of an imaging area of the virtual camera IC, as illustrated in FIG. 6B. FIG. 6B illustrates the viewable-area image Q represented by the viewable-area information that is set by default. The viewable-area information, which is expressed in a coordinate indicating the location of the virtual camera IC, may alternatively be expressed in an imaging area (X, Y, Z) of the virtual camera IC that corresponds to the viewable area T.

Figure 7:
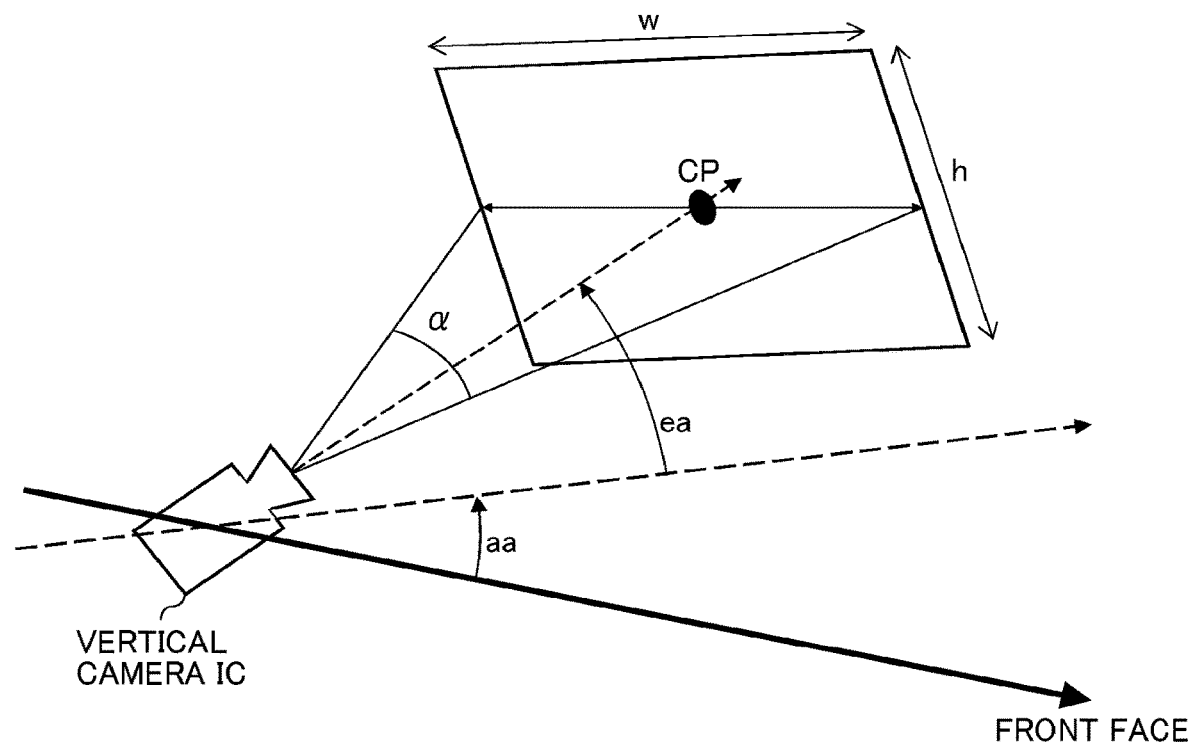
FIG. 7 is an illustration for explaining parameters of a partial image, according to embodiments.

FIG. 7 is an illustration for explaining parameters of a partial image. The following describes a method of designating a part of the spherical image, as a partial image. The coordinate of the central point CP of the partial image, in the spherical image, can be defined using an imaging direction of a camera (virtual camera IC) capturing the spherical image. Assuming that the center of the spherical image as a whole image, corresponds to a surface of the spherical image facing a viewer-side, that center has an azimuth angle "aa", and an elevation angle "ea". Further, an angle of view in the diagonal direction (the diagonal angle of view) α can be used to represent a range (area) of the partial image. The range in the vertical and horizontal directions, can be represented by an aspect ratio (width w/ height h) of the image. In alternative to using the diagonal angle of view α and the aspect ratio w/h, the range of the partial image may be represented by the vertical angle of view and the horizontal angle of view, or the vertical angle of view and the aspect ratio w/h. In addition to the azimuth angle and the elevation angle, a rotation angle may be used.

<Overview of Image Capturing System>

Figure 8:
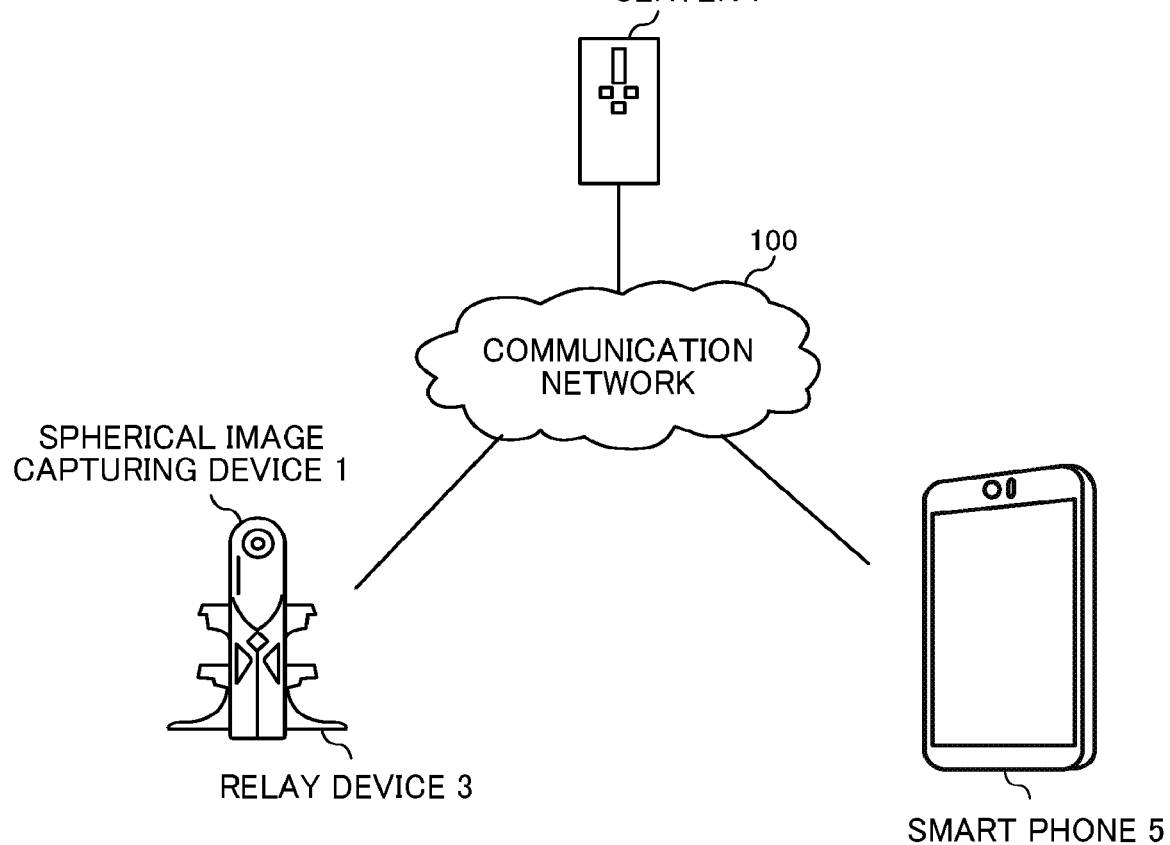
FIG. 8 is a schematic view illustrating an image capturing system according to an embodiment.

First, referring to FIG. 8, an overview of the image capturing system is described according to the embodiment. FIG. 8 is a schematic view illustrating the image capturing system according to an embodiment.

As illustrated in FIG. 8, the image capturing system includes the spherical image capturing device 1, a relay device 3, a smart phone 5, and an image management server 7.

The spherical image capturing device 1 is a special digital camera, which captures an image of an object or surroundings such as scenery to obtain two hemispherical images, from which a spherical (panoramic) image is generated, as described above referring to FIGS. 1 to 7.

The relay device 3 enables the spherical image capturing device 1 to communicate with any device on the communication network 100 such as the Internet. Even when the spherical image capturing device 1 is not able to directly communicate via the communication network 100, the spherical image capturing device 1 communicates with the relay device 3 using short-range wireless communication, to establish communication with such as the image management server 7 on the communication network 100 via the relay device 3. That is, the relay device 3 intermediates communication between the spherical image capturing device 1 and the image management server 7. The short-range wireless communication is based on such as Wi-Fi, Bluetooth (Registered Trademark), and Near Field Communication (NFC). In FIG. 8, the relay device 3 is used as a dongle receiver on which the spherical image capturing device 1 is mounted.

The smart phone 5 communicates with the image management server 7 via the communication network 100 by wired or wireless communication. The smart phone 5 is capable of displaying images obtained from the spherical image capturing device 1, on a display 517 provided for the smart phone 5.

The image management server 7, which is implemented by one or more computers, transfers a request for video or still image from the smart phone 5, to the spherical image capturing device 1 via the relay device 3. The image management server 7 transmits video data or still image data, received from the spherical image capturing device 1 via the relay device 3, to the smart phone 5.

While only one set of the spherical image capturing device 1 and the relay device 3 is illustrated in FIG. 1, a plurality of sets of the spherical image capturing device 1 and the relay device 3 may be provided in the image capturing system. Similarly, while only one smart phone 5 is illustrated, a plurality of smart phones 5 may be used. In this disclosure, the smart phone 5 is an example of communication terminal. Other examples of communication terminal include, but not limited to, PC, smart watch, game machine, and car navigation system. The image management server 7 may be implemented by one or more computers.

<Hardware Configuration>

Next, referring to FIGS. 9 to 12, hardware configurations of the spherical image capturing device 1, relay device 3, smart phone 5, and image management server 7 are described according to the embodiment.

<Hardware Configuration of Spherical Image Capturing Device>

Figure 9:
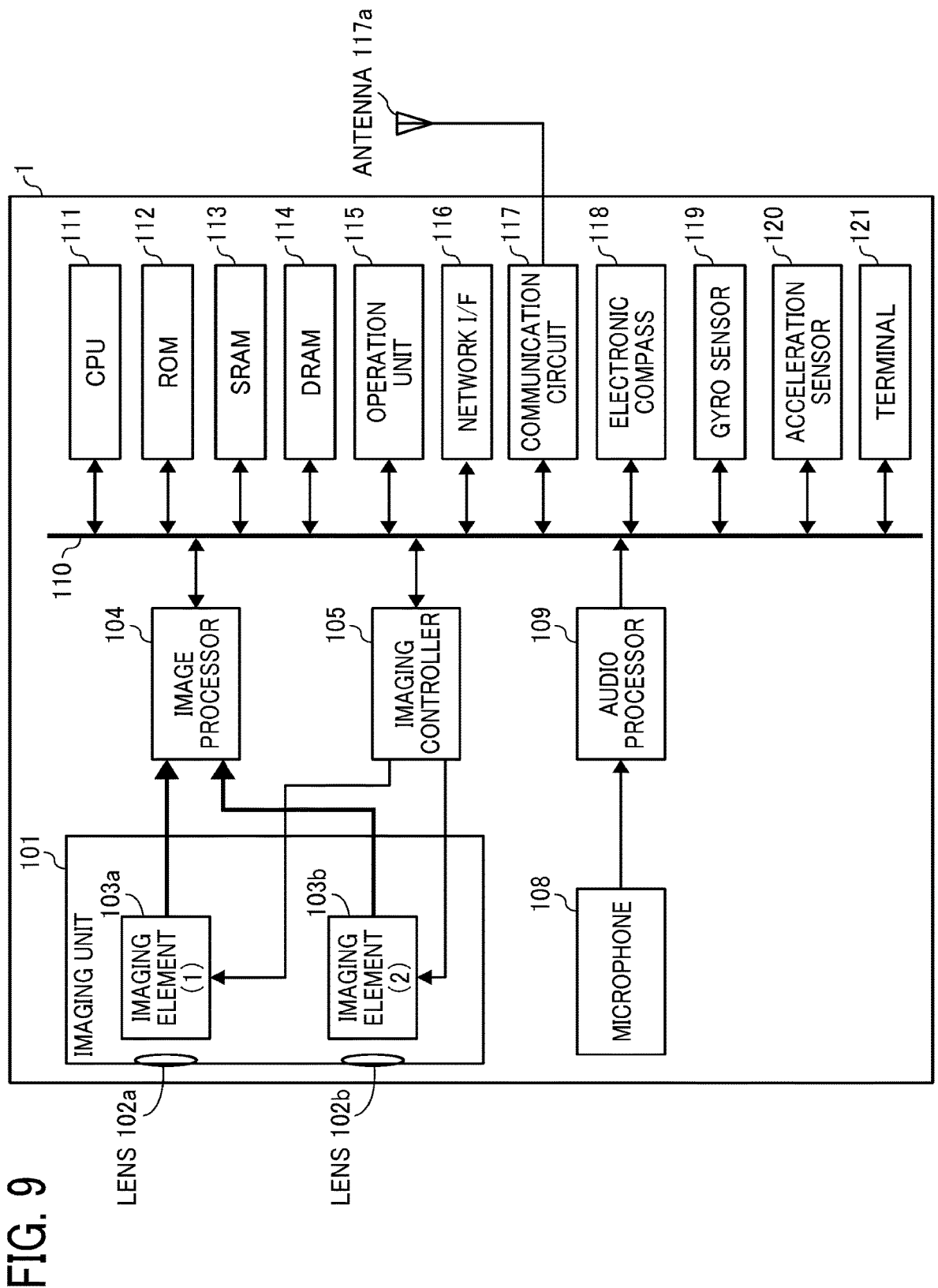
FIG. 9 is a schematic block diagram illustrating a hardware configuration of a spherical image capturing device of FIG. 8, according to the embodiment.

First, referring to FIG. 9, a hardware configuration of the spherical image capturing device 1 is described according to the embodiment. FIG. 9 is a schematic block diagram illustrating a hardware configuration of the spherical image capturing device 1. The following describes a case in which the spherical image capturing device 1 is a full-view spherical (omnidirectional) image capturing device capable of capturing 4π radian image, with two imaging elements. However, the spherical image capturing device 1 may include any suitable number of imaging elements, providing that it includes at least two imaging elements. In addition, the spherical image capturing device 1 is not necessarily an image capturing device dedicated to omnidirectional image capturing. Alternatively, an external omnidirectional image capturing unit may be attached to a general-purpose digital camera or a smart phone to implement an image capturing device having substantially the same function as that of the spherical image capturing device 1.

As illustrated in FIG. 9, the spherical image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a terminal 121.

The imaging unit 101, which may be referred to as an imaging device, includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network IIF 116, the communication circuit 117, and the electronic compass 118 are also connected to the bus 110. The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the spherical image capturing device 1 is capable of displaying a preview image on a display (e.g., the display of the smart phone 5) or displaying a video image (movie). In case of displaying movie, the image data are continuously output from the imaging elements 103a and 103b at a predetermined frame rate (frames per second).

Furthermore, the imaging controller 105 operates in cooperation with the CPU 111 to synchronize the time when the imaging element 103a outputs image data and the time when the imaging element 103b outputs the image data. It should be noted that, although the spherical image capturing device 1 does not include a display in this embodiment, the spherical image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the spherical image capturing device 1, for example, by performing predetermined processing. The CPU 501 may be a single or a plurality of processors. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the spherical image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the spherical image capturing device 1 by short-range wireless communication such as Wi-Fi, NFC, and Bluetooth. The communication circuit 117 is also capable of transmitting the data of equirectangular projection image to the external device such as the smart phone 5. In this example illustrated in FIG. 8, the communication circuit 117 communicates with the relay device 3 by short-range wireless communication, to communicate with the smart phone 5 or the image management server 7 via the relay device 3. However, the image capturing device 1 may communicate with the smart phone 5 or the image management server 7 directly, for example, using the network I/F 116. In such case, the relay device 3 does not have to be provided.

The electronic compass 118 calculates an orientation of the spherical image capturing device 1 from the Earth's magnetism to output orientation information. This orientation and tilt information is an example of related information, which is metadata described in compliance with Exif. This information is used for image processing such as image correction of captured images. The related information also includes a date and time when the image is captured by the spherical image capturing device 1, and a size of the image data.

The gyro sensor 119 detects the change in tilt of the spherical image capturing device 1 (roll, pitch, yaw) with movement of the spherical image capturing device 1. The change in angle is one example of related information (metadata) described in compliance with Exif. This information is used for image processing such as image correction of captured images.

The acceleration sensor 120 detects acceleration in three axial directions. The spherical image capturing device 1 calculates its position (an angle with respect to the direction of gravity), based on the acceleration detected by the acceleration sensor 120. With the gyro sensor 119 and the acceleration sensor 120, the spherical image capturing device 1 is able to correct images with high accuracy.

The terminal 121 is a connector (with a recess) for Micro USB.

<Hardware Configuration of Relay Device>

Figure 10:
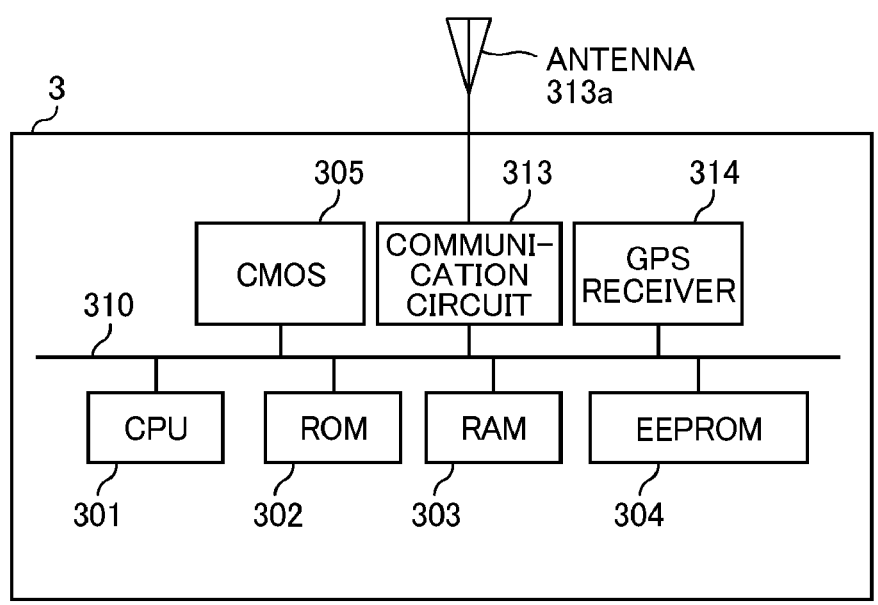
FIG. 10 is a schematic block diagram illustrating a hardware configuration of a relay device of FIG. 8 according to the embodiment.

Referring to FIG. 10, a hardware configuration of the relay device 3 is described according to an embodiment. FIG. 10 is a schematic diagram illustrating a hardware configuration of the relay device 3, when implemented as a cradle with wireless communication capability.

As illustrated in FIG. 10, the relay device 3 includes a CPU 301, ROM 302, RAM 303, EEPROM 304, and CMOS sensor 305. The CPU 301 controls entire operation of the relay device 3. The ROM 302 stores basic input/output program. The RAM 303 functions as a work area for the CPU 301. The EEPROM 304 reads or writes data under control of the CPU 301. The CMOS sensor 305, as an imaging element, captures a subject to obtain image data under control of the CPU 301.

The EEPROM 304 stores operating system (OS) and other programs to be executed by the CPU 301, and various data to be used in execution. In alternative to the CMOS sensor 305, a CCD sensor may be used.

The relay device 3 further includes an antenna 313a, communication circuit 313, GPS receiver 314, and bus line 310. The communication circuit 313 communicates with the image management server 7 via the communication network 100 using a wireless signal through the antenna 313a. The GPS receiver 314 receives a GPS signal including location information (latitude, longitude, and altitude) of the relay device 3, from Global Positioning Systems (GPS) satellite or Indoor Messaging System (IMES). The bus line 310, implemented by an address bus or data bus, electronically connects the above-described elements in the relay device 3.

<Hardware Configuration of Smart Phone>

Figure 11:
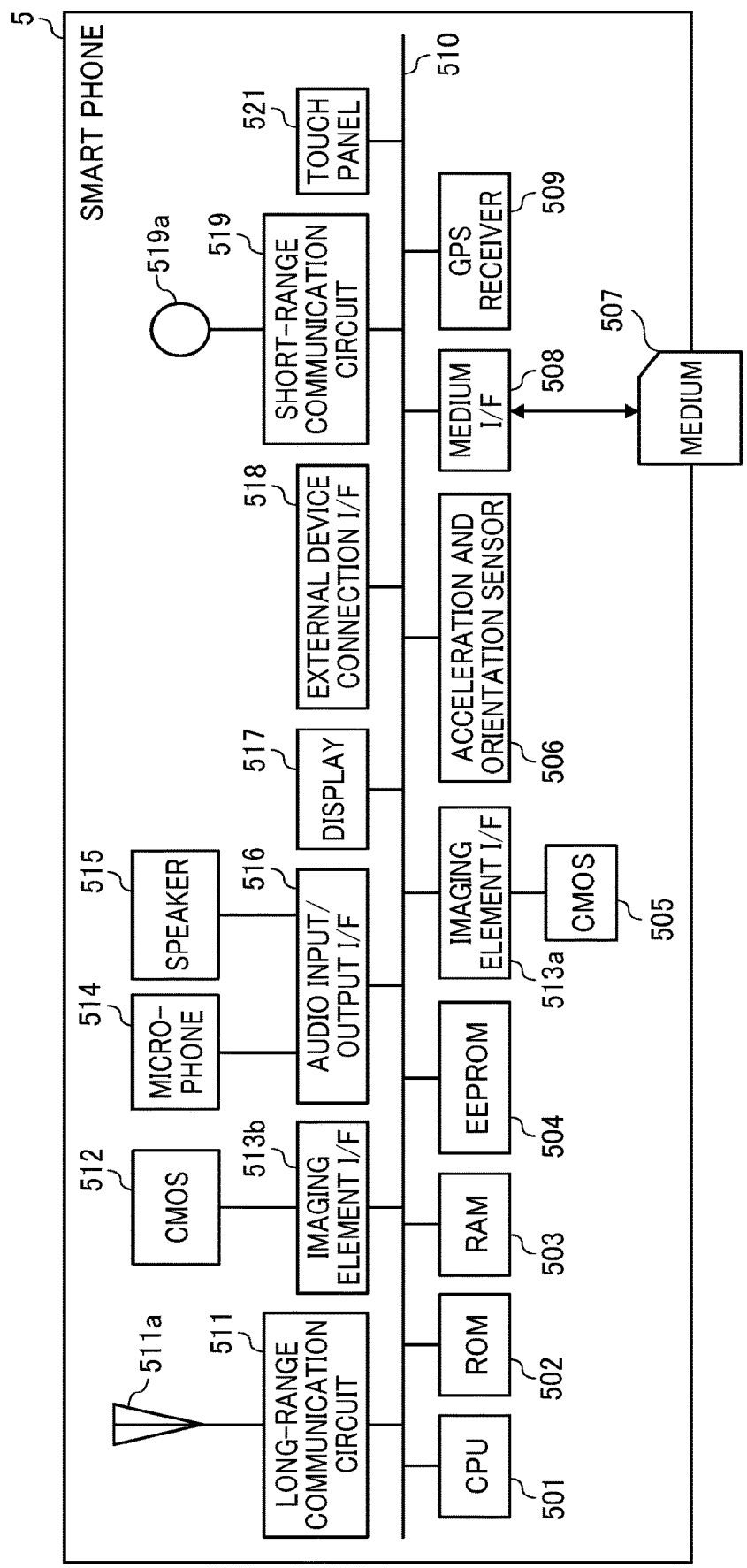
FIG. 11 is a schematic block diagram illustrating a hardware configuration of a smart phone of FIG. 8, according to the embodiment.

Referring to FIG. 11, a hardware configuration of the smart phone 5 is described according to the embodiment. FIG. 11 illustrates a hardware configuration of the smart phone 5. As illustrated in FIG. 11, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The CPU 501 may be a single or a plurality of processors. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element I/F 513a is a circuit that controls driving of the CMOS sensor 512. The acceleration and orientation sensor 506 includes various sensors such as an electromagnetic compass or gyrocompass for detecting geomagnetism, and an acceleration sensor. The medium I/F 508 controls reading or writing of data with respect to a recording medium 507 such as a flash memory. The GPS receiver 509 receives a GPS signal from a GPS satellite.

The smart phone 5 further includes a long-range communication circuit 511, an antenna 511a for the long-range communication circuit 511, a CMOS sensor 512, an imaging element I/F 513b, a microphone 514, a speaker 515, an audio input/output I/F 516, a display 517, an external device connection I/F 518, a short-range communication circuit 519, an antenna 519a for the short-range communication circuit 519, and a touch panel 521.

The long-range communication circuit 511 is a circuit that communicates with other device through the communication network such as the Internet. The CMOS sensor 512 is an example of a built-in imaging device capable of capturing an object under control of the CPU 501. The imaging element I/F 513a is a circuit that controls driving of the CMOS sensor 512. The microphone 514 is an example of audio collecting device, which is a built-in type, capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The short-range communication circuit 519 is a communication circuit that communicates in compliance with the NFC, the Bluetooth, and the like. The touch panel 521 is an example of input device that enables the user to input a user instruction to the smart phone 5 through touching a screen of the display 517.

The smart phone 5 further includes a bus line 510. Examples of the bus line 510 include an address bus and a data bus, which electrically connects the elements such as the CPU 501.

<Hardware Configuration of Image Management Server>

Figure 12:
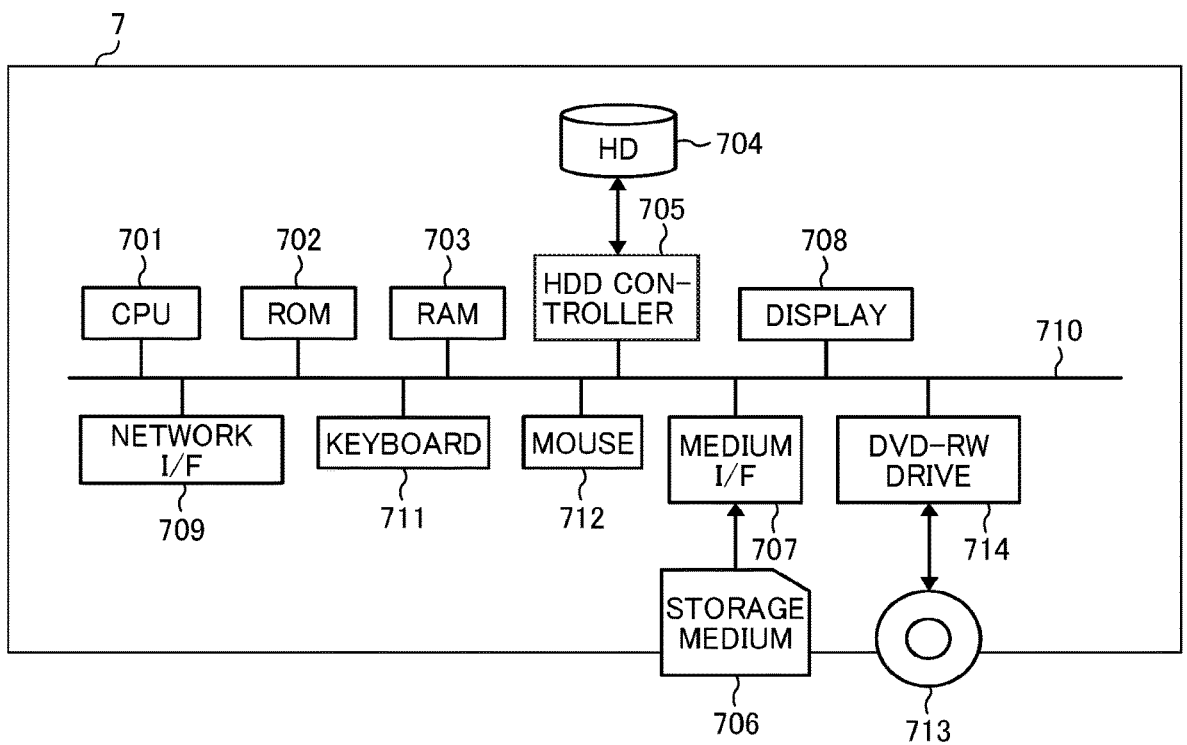
FIG. 12 is a hardware configuration diagram of an image management server of FIG. 8, according to the embodiment.

Referring to FIG. 12, a hardware configuration of the image management server 7 is described according to an embodiment. FIG. 12 is a schematic diagram illustrating a hardware configuration of the image management server 7 according to the embodiment.

As illustrated in FIG. 12, the image management server 7 includes a CPU 701, a ROM 702, a RAM 703, a hard disk (HD) 704, a hard disk drive (HDD) 705, a medium I/F 707, a display 708, a network I/F 709, a bus line 710, a keyboard 711, a mouse 712, and a DVD-RW drive 714.

The CPU 701 controls entire operation of the image management server 7. The ROM 702 stores a control program for controlling the CPU 701 such as an IPL. The RAM 703 is used as a work area for the CPU 701. The RD 704 stores various data such as programs. The HDD 705 controls reading or writing of various data to or from the HD 704 under control of the CPU 701. The display 708 displays various information such as a cursor, menu, window, characters, or image. The medium I/F 707 controls reading or writing of data with respect to a recording medium 706 such as a flash memory. The network I/F 709 is an interface that controls communication of data with an external device through the communication network 100. The bus line 710 may be an address bus or a data bus, which electrically connects various elements such as the CPU 701 of FIG. 12.

The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The DVD-RW drive 714 reads or writes various data with respect to a DVD ReWritable (DVD-RW) 713, which is one example of removable recording medium. In alternative to the DVD-RW, any recording medium may be used such as a DVD-R, Blu-ray Disc (Blu-ray Disc), etc.

<Functional Configuration>

Referring now to FIGS. 13 to 16, a functional configuration of the image capturing system is described according to the embodiment. In this disclosure, the relay device 3 relays communication between the spherical image capturing device 1 and the image management server 7 by transmitting or receiving data therebetween. For simplicity, description of the functional configuration of the relay device 3 is omitted below.

<Functional Configuration of Spherical Image Capturing Device>

Figure 13:
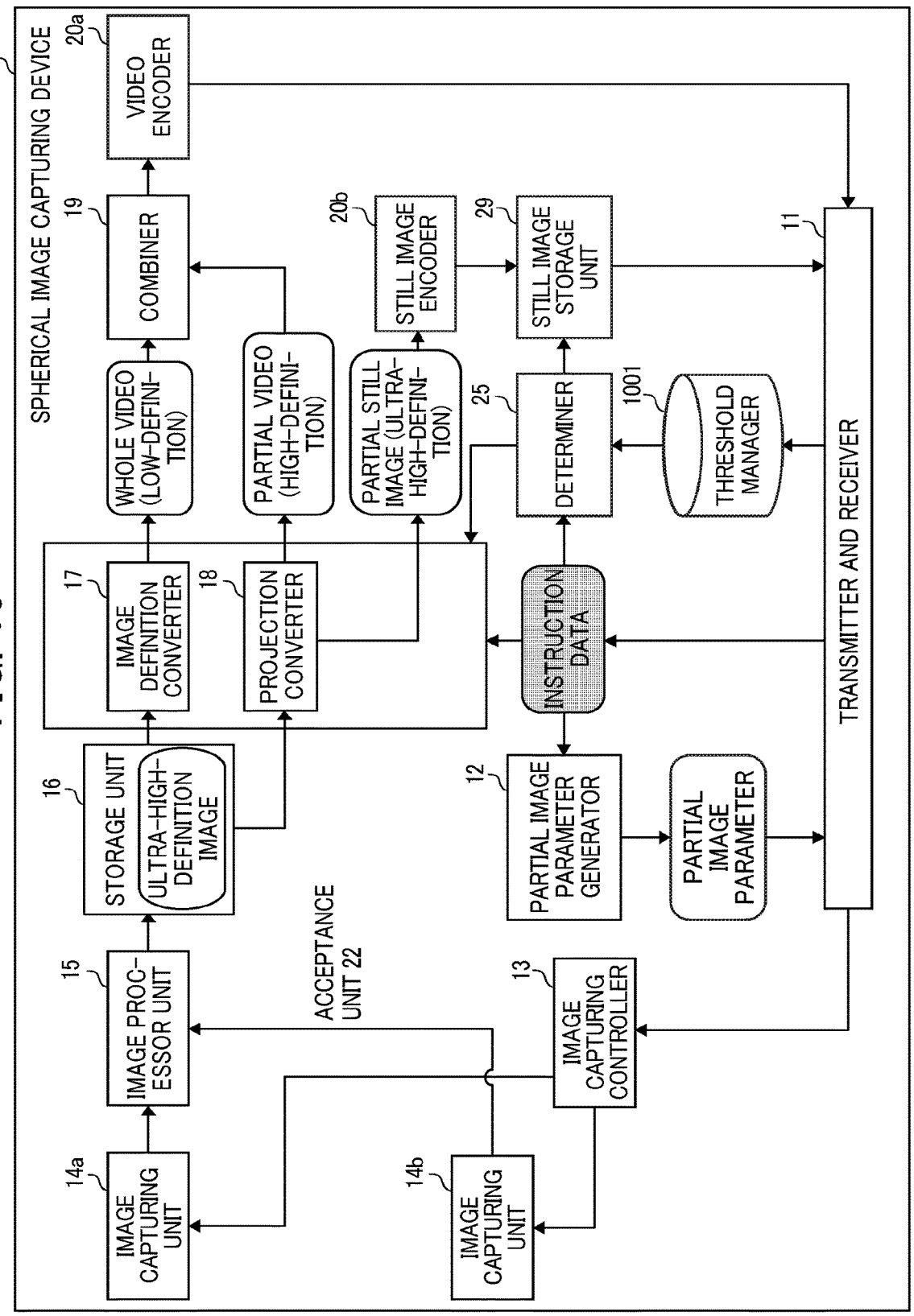
FIG. 13 is a schematic block diagram illustrating a functional configuration of the spherical image capturing device of FIG. 8, according to the embodiment.

FIG. 13 is a schematic block diagram illustrating a functional configuration of the spherical image capturing device 1 according to the embodiment. The spherical image capturing device 1 includes a transmitter and receiver 11, a partial image parameter generator 12, an image capturing controller 13, image capturing units 14a and 14b, an image processor 15, a storage unit 16, an image definition converter 17, a projection converter 18, a combiner 19, a video encoder 20a, a still image encoder 20b, an acceptance unit 22, a determiner 25, and a still image storage unit 29. These units are functions that are implemented by or that are caused to function by operating any of the elements illustrated in FIG. 9 in cooperation with the instructions of the CPU 111 according to the spherical image capturing device control program expanded from the SRAM 113 to the DRAM 114. The spherical image capturing device 1 further includes a threshold manager 1001, which is implemented by the SRAM 113.

(Threshold of Angle of View)

Figures 16A, 16B:
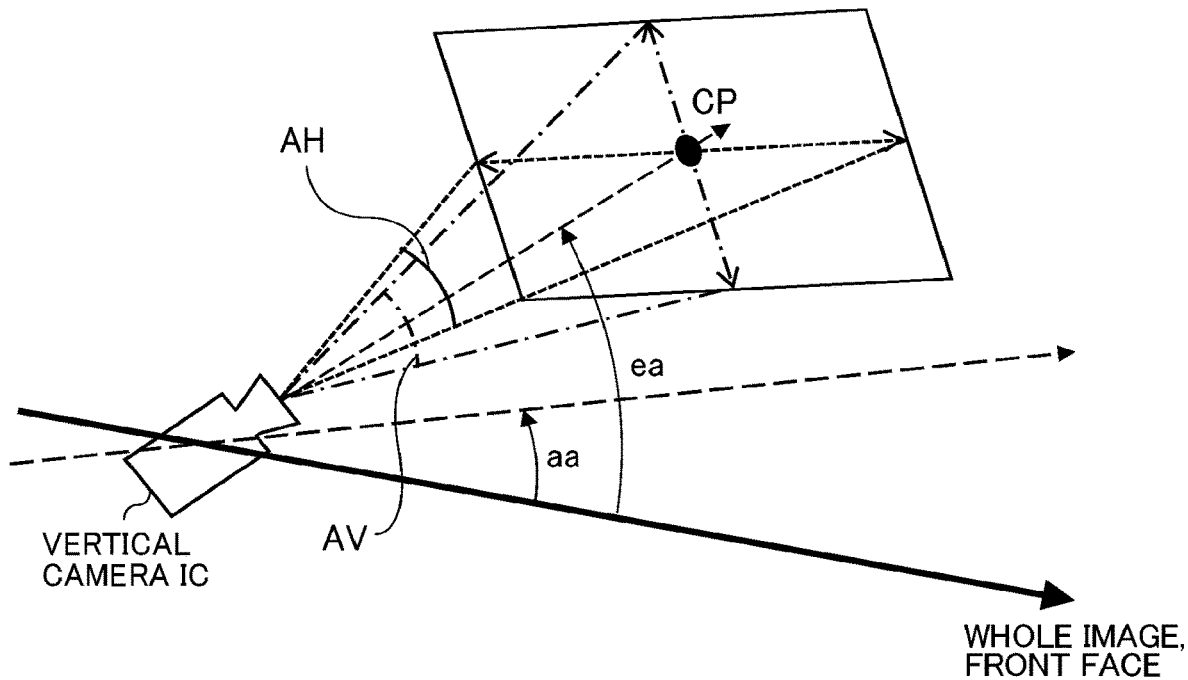
FIG. 16A is a conceptual diagram illustrating information on threshold value of angle of view.
FIG. 16B is an illustration for explaining horizontal angle of view and vertical angle of view.

FIG. 16A is a conceptual diagram illustrating information on a threshold value of an angle of view. FIG. 16B is a diagram illustrating a horizontal angle of view and a vertical angle of view.

As illustrated in FIG. 16A, the threshold manager 1001 stores information on a threshold value of an angle of view for each of a plurality of configuration patterns ("Configuration 1" to "Configuration 4"). In this example, the threshold of the angle of view includes a threshold of a horizontal angle of view and a threshold of a vertical angle of view. Alternatively, the threshold of the angle of view may only include one of the threshold of the horizontal angle of view and the threshold of the vertical angle of view. The table of FIG. 16A is previously stored, for example, before the spherical image capturing device 1 is shipped to a user site. While the information on the threshold of the angle of view is expressed in the form of table, this information may be expressed in any other way.

Referring to FIG. 16A, for each configuration pattern, a threshold value of an angle of view of an area as a partial image, is associated with a maximum recording resolution of the spherical image capturing device 1 (expressed by a number of horizontal pixels W and a number of vertical pixels H), and a maximum display resolution of the smart phone 5 set by the user (expressed by a number of horizontal pixels W' and a number of vertical pixels H'). As described below, the threshold value of the horizontal angle of view (AH) and the vertical angle of view (AV) is used to determine whether to transmit the partial image to the smart phone 5 from the spherical image capturing device 1 via the image management server 7.

The table of FIG. 16A stores four configuration patterns, however, any number of configuration patterns may be stored, such that the patterns may be between one and three, or more than five. Further, the table of FIG. 16 does not have to be provided. In such case, a threshold value of an angle of view may be calculated using the equation, for example, as described below.

Referring now to FIG. 16B, a horizontal angle of view AH and a vertical angle of view AV are described. Since the central point CP, the azimuth angle "aa", and the elevation angle "ea" have been described in FIG. 7, description thereof is omitted. For the spherical image (either video or still image), a size of the entire one frame of the partial image (video or still image) can be expressed by an imaging direction of a camera capturing the image (virtual camera). Specifically, the horizontal length of the partial image can be expressed by the horizontal angle of view AH from the virtual camera IC. The vertical length of the partial image can be expressed by the vertical angle of view AV from the virtual camera IC. The threshold of the horizontal angle of view AH and the threshold of the vertical angle of view AV are each an angle where resolution of the image before conversion and resolution of the image after conversion are made equal, and can be obtained using the following Equations 1 and 2.

$$AH = (360/W) * W' \qquad \text{(Equation 1)}$$

$$AV = (180/H) * (H'/2) \qquad \text{(Equation 2)}$$

In this embodiment, even when the maximum recording resolution of the spherical image capturing device 1 is 4000 pixels by 2000 pixels, the spherical image capturing device 1 stores information on the threshold of an angle of view for four configurations as illustrated in FIG. 16A. However, the spherical image capturing device 1 only refers to the configuration 1 and the configuration 2. Similarly, even when the maximum display resolution set by the user at the smart phone 5 is 1920 pixels by 1080 pixels, the spherical image capturing device 1 stores information on the threshold of an angle of view for four configurations as illustrated in FIG. 16A, even the spherical image capturing device 1 only refers to the configuration 1 and the configuration 3.

The following example describes how the threshold value of an angle of view is obtained for the configuration 1.

In the configuration 1, the maximum recording resolution of the spherical image capturing device 1 is 4000 pixels by 2000 pixels, and the instruction data from the user at the smart phone 5 requests for image data (video or still image) having a resolution of 1920 pixels by 1080 pixels. In such case, the determiner 25 determines whether the angle of view of the partial image, requested by the instruction data, is equal to or greater than the threshold of angle of view stored for the configuration 1. When the angle of view of the partial image is less than the threshold of angle of view for the configuration 1, the determiner 25 determines not to apply projection transformation to the ultra-high-definition whole image using the projection converter 18 to generate the ultra-high-definition partial still image. In this example, the determiner 25 may determine whether the horizontal angle of view and the vertical angle of view for the partial image is equal to or greater than corresponding one of the threshold of horizontal angle of view (172.8 degrees) and the threshold of vertical angle of view (48.6 degrees), and determines not to apply projection transformation when the horizontal angle of view and the vertical angle of view for the partial image are both less than the corresponding one of the threshold of horizontal angle of view (172.8 degrees) and the threshold of vertical angle of view (48.6 degrees). Alternatively, the determiner 25 may only use one of the horizontal angle of view and the vertical angle of view to make determination.

Referring to FIG. 13, a functional configuration of the spherical image capturing device 1 is described in detail.

The transmitter and receiver 11 transmits or receives image data to or from an extraneous source. Examples of image data include, but not limited to, ultra-high-definition partial still image, high-definition partial video image, and low-definition whole video image.

The transmitter and receiver 11 may transmit the partial image parameters to the smart phone 5, or receive the instruction data from the smart phone 5.

In this embodiment, images of three different resolution levels are processed. For the descriptive purposes, the ultra-high-definition image, high-definition image, and low-definition image are used, with the image definition decreasing from a higher level to a lower level in this order. For example, the ultra-high-definition image has a resolution that is substantially equal to that of the maximum recording resolution of the spherical image capturing device 1. The high-definition image has a resolution that is lower than that of the ultra-high definition image. The low-definition image has a resolution that is even lower than that of the high-definition image.

Further, in this embodiment, the wide-angle image is any image having an angle of view of 100 degrees or greater. The narrow-angle image is any image having an angle of view, narrower than that of the wide-angle image, such as having an angle of view of 90 degrees or less.

The partial image parameter generator 12 generates partial image parameters based on the instruction data sent from the smart phone 5 via the image management server 7. The instruction data is generated according to a user operation received at the acceptance unit 52 of the smart phone 5, and is an instruction for specifying an area to be viewed, which is a part of the whole image. The area to be viewed corresponds to an area, which is to be cut out from the whole image at the spherical image capturing device 1, as the partial image. The partial image parameters are used to specify a superimposed area, which is an area on which the partial image (the superimposed image S) is to be superimposed on the spherical image CE (whole image), when displayed at the smart phone 5. The partial image parameter generator 12 is implemented by instructions of the CPU 111.

The image capturing controller 13 outputs an instruction to each of the image capturing units 14a and 14b, to synchronize timings at which the image data are output from the imaging capturing units 14a and 14b. The image capturing controller 13 is implemented by the instructions of the CPU 111, which operates with the imaging controller 105.

The image capturing units 14a and 14b respectively capture an object according to instructions from the image capturing controller 13, to output data of hemispherical images, from which the spherical image is generated, as illustrated in FIGS. 3A and 3B. The image capturing units 14a and 14b correspond to the imaging elements 103a and the lens 102a, and the imaging element 103b and the lens 102b, respectively.

The image processor 15 synthesizes and converts data of two hemispherical images obtained by the image capturing units 14a and 14b into data of an equirectangular projection image in equirectangular projection. The image processor 15 corresponds to the image processor 104, which is implemented by an image processing circuit.

The storage unit 16 serves as a buffer for temporarily storing data of the equirectangular projection image synthesized and converted by the image processor 15. The equirectangular projection image, at this stage, is an ultra-high-definition image, as the image is generated by combining the images captured at the image capturing units 14a and 14b. The storage unit 16 may be implemented by a RAM.

The image definition converter 17 converts equirectangular projection video image, from the ultra-high-definition image into a low-definition image. Accordingly, the low-definition, equirectangular projection image (whole image) is generated. The image definition converter 17 may generate the low-definition, whole image, according to a request for video received from the smart phone 5, for example, by reducing a size or resolution of the image. As described below referring to FIG. 17, the spherical image capturing device 1 may receive instruction data with the request for video. In this example, the low-definition, whole image may correspond to entire or a part of the equirectangular projection image generated and stored in the storage unit 16. The image definition converter 17 may be implemented by instructions of the CPU 111.

The projection converter 18 applies projection transformation to a part of the equirectangular projection video image, to convert from the equirectangular projection to the perspective projection, according to the request for video, received at the transmitter and receiver 11. With the request for video, the instruction data may be received. For example, the instruction data indicates an imaging direction, angle of view, aspect ratio of a partial image (a part of the whole image), and an image size for data transmission to the smart phone 5. Further, image definition (or resolution) of the video image is made lower than that of the equirectangular projection, whole video image stored in the storage unit 16. Accordingly, the high-definition, partial video image is generated. As described above, the whole image data output from the image definition converter 17 has a lower definition (or resolution) than that of the partial image data output from the projection converter 18. That is, the partial image data output from the projection converter 18 has a higher definition (resolution) than that of the whole image data output from the image definition converter 17.

Further, the projection converter 18 applies projection transformation to a part of a frame of the equirectangular projection video image, to convert from the equirectangular projection to the perspective projection, according to a request for still image and the instruction data, received at the transmitter and receiver 11. The instruction data indicates an imaging direction, angle of view, aspect ratio of a partial image (a part of the whole image), and an image size for data transmission to the smart phone 5. Further, resolution of the still image is kept the same with that of the ultra-high-definition, equirectangular projection image stored in the storage unit 16. Accordingly, the ultra-high-definition, partial still image is generated.

As described above, the projection converter 18 not only applies projection transformation to an area, cut out from the equirectangular projection image, but also changes image definition (resolution) of the ultra-high-definition equirectangular projection image to generate the high-definition partial video image.

In this example, the partial video image is generated to have a resolution lower than that of the partial still image, but higher than that of the low-definition, whole image.

Alternatively, the partial video image and the partial still image generated by the projection converter 18 may each be generated as the ultra-high-definition image having a resolution higher than that of the low-definition, whole image.

For the descriptive purposes, the example case in which an equirectangular projection image of 2K, 4K, or 8K is generated as an ultra-high-definition image is described.

The partial still image, output from the projection converter 18, is data having its projection converted to a predetermined projection, while keeping its resolution (either 2K, 4K, or 8K), based on data of the high-definition, equirectangular projection image. On the other hand, the whole video image output from the definition converter 17 is data having its definition (resolution) lowered than that of the equirectangular projection image (for example, lowered to 1K, 2K, or 4K).

In case the partial video image is made lower in resolution than that of the partial still image, the partial video image may have its definition higher than that of the equirectangular projection image but lower than that of the partial still image (for example, 1.5K, 3K, and 6K, or any value between 1K to 2K, 2K to 4K, or 4K to 8K).

Figure 20:
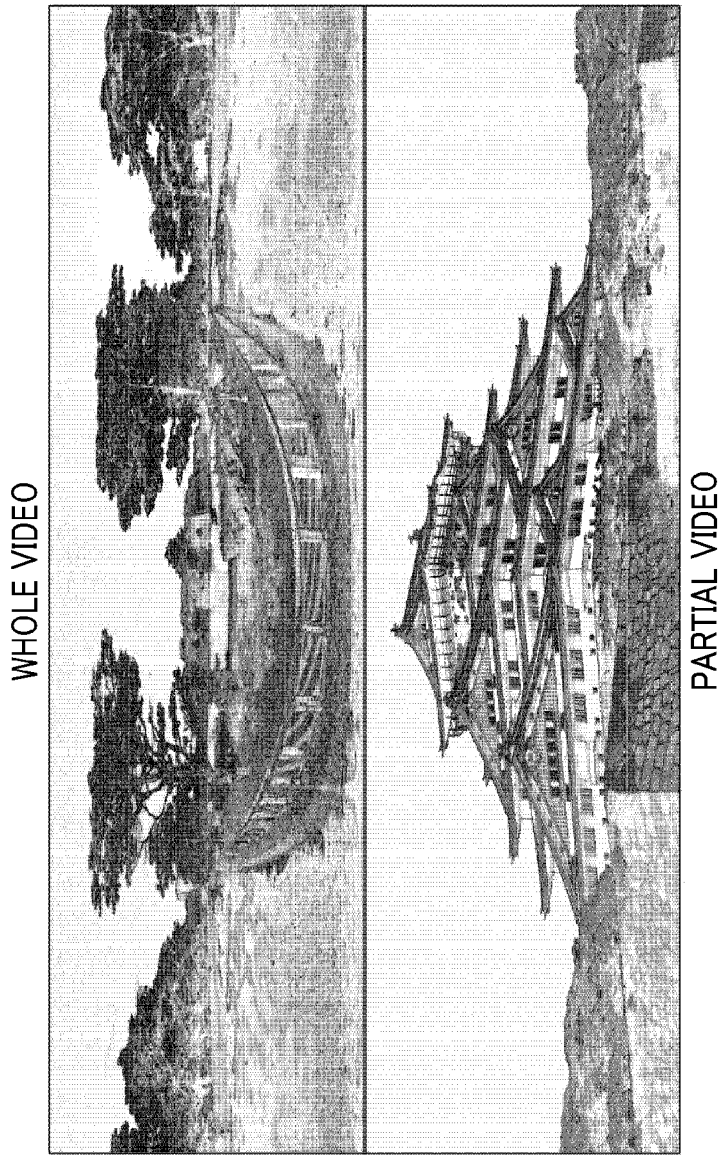
FIG. 20 is a conceptual diagram illustrating data in which a frame of whole video image and a frame of partial video image is combined, according to the embodiment.

The combiner 19 combines each frame of the low-definition, whole video image generated by the image definition converter 17, and a corresponding frame of the high-definition, partial video image generated by the projection converter 18, into one frame of image. In combining, as illustrated in FIG. 20, vertical resolution (resolution of a vertical length) of each image to be combined is reduced in half.

By combining a set of frames into one frame while reducing resolution of images to be combined, a size of data to be transmitted via the network can be reduced.

Even when the partial video image has a definition substantially equal to that of the partial still image when output from the projection converter 18, definition of the partial video image is made lower than that of the partial still image through this process of lowering resolution and higher than that of the whole image that also goes through the same process.

Further, this set of frames to be combined are each generated from the same equirectangular projection image stored in the storage unit 16. Accordingly, this set of frames to be combined as images captured at the same time, can be associated, without metadata for associating the frames to be combined.

The video encoder 20a encodes data of the whole video image and the partial video image, combined at the combiner 19. The still image encoder 20b encodes the partial still image.

The acceptance unit 22 receives various operations by the user via the operation unit 115 of the image capturing device 1.

The determiner 25 determines whether an entire frame of the partial image, which is a part of the whole video image, is smaller than a predetermined area determined by a threshold value of angle of view stored in the threshold manager 1001 as illustrated in FIG. 16A. When an area of the partial image is smaller than the predetermined area determined by the threshold of angle of view, the determiner 25 controls the projection converter 18 not to generate the ultra-high-definition partial still image from the ultra-high-definition whole video image. When an area of the partial image is equal to or greater than the predetermined area determined by the threshold of angle of view, the determiner 25 controls the projection converter 18 to apply projection transformation to a part of the ultra-high-definition whole video image to generate the ultra-high-definition partial still image.

For example, as described above referring to FIG. 16, in the configuration 1, the maximum recording resolution of the spherical image capturing device 1 is 4000 pixels by 2000 pixels, and the instruction data from the user at the smart phone 5 requests for image data (video or still image) having a resolution of 1920 pixels by 1080 pixels, which is a maximum display resolution of the smart phone 5. In such case, the determiner 25 determines not to apply projection transformation using the projection converter 18 such that the ultra-high-definition still image is not generated, when an area (the partial image) instructed by the instruction data has a horizontal angle of view less than 172.8 degrees and a vertical angle of view of less than 48.6 degrees.

When an area cut out as the partial image, requested by the smart phone 5, is smaller than an area indicated by the threshold of angle of view, the user at the smart phone 5 would not be able to tell differences between the ultra-high-definition partial image and the high-definition partial image. For this reasons, it becomes meaningless to transmit and display the ultra-high definition partial still image.

On the other hand, when an area (the partial image) instructed by the instruction data has a horizontal angle of view equal to or greater than 172.8 degrees and a vertical angle of view equal to or greater than 48.6 degrees, the determiner 25 determines to control the projection converter 18 to apply projection transformation to generate the ultra-high-definition still image. In such case, the smart phone 5 switches display of an area of user's interest, from the high-definition partial video image to the ultra-high-definition partial still image, to display the area of the user's interest clearly.

In the above-described example, the determiner 25 determines not to generate the ultra-high-definition still image when the instruction data instructs to display an area having an angle of view equal to or greater than the threshold, and not to generate the ultra-high-definition still image when such area has an angle of view less than the threshold. Alternatively, the determiner 25 may determine not to generate the ultra-high-definition still image when the instruction data instructs to display an area having an angle of view greater than the threshold, and not to generate the ultra-high-definition still image when such area has an angle of view equal to or less than the threshold.

<Functional Configuration of Smart Phone>

Figure 14:
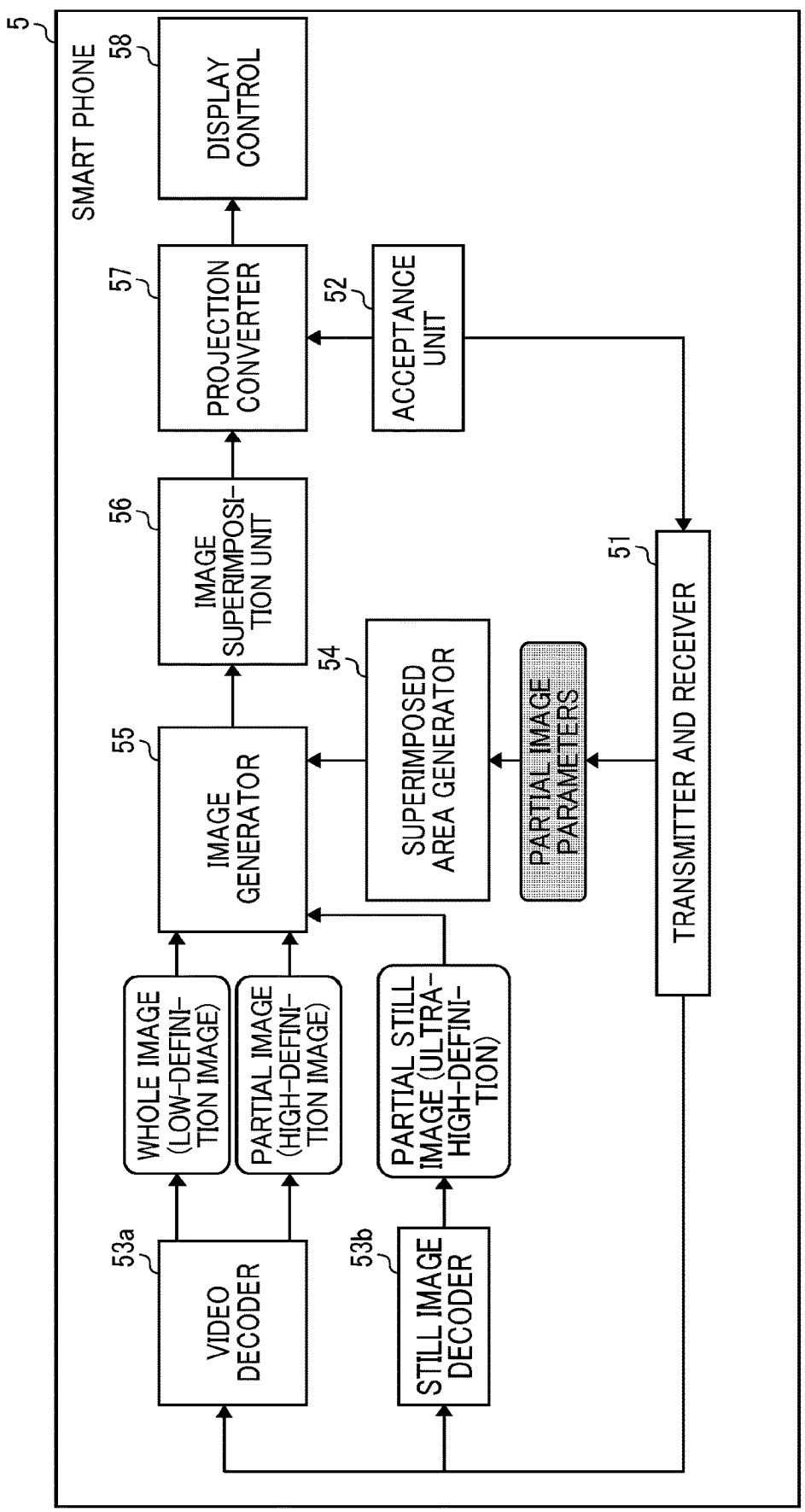
FIG. 14 is a schematic block diagram illustrating a functional configuration of the smart phone of FIG. 8, according to the embodiment.

FIG. 14 is a functional block diagram of the smartphone according to the present embodiment. The smart phone 5 includes a transmitter and receiver 51, an acceptance unit 52, a video decoder 53a, a still image decoder 53b, a superimposed area generator 54, an image generator 55, an image superimposing unit 56, a projection converter 57, and a display control 58. These units are functions that are implemented by or that are caused to function by operating any of the hardware elements illustrated in FIG. 11 in cooperation with the instructions of the CPU 501 according to the control program for the smart phone 5, expanded from the EEPROM 504 to the RANI 503.

<Functional Configuration of Smart Phone>

Referring to FIG. 14, a functional configuration of the smart phone 5 is described in detail.

The transmitter and receiver 51 transmits or receives data to or from an extraneous source. For example, the transmitter and receiver 51 receives image data from the transmitter and receiver 11 of the spherical image capturing device 1, or transmits instruction data to the transmitter and receiver 11 of the spherical image capturing device 1. The transmitter and receiver 51 separates the image data (video data of whole image and partial image illustrated in FIG. 20) and the partial image parameters into different data, which is received from the transmitter and receiver 11 of the spherical image capturing device 1.

The acceptance unit 52 accepts a user operation for designating the imaging direction, the angle of view, the aspect of the partial image, and the size of the image data to be received by the smart phone 5. The acceptance unit 52 generates instruction data based on the user operation, which is to be transmitted to the spherical image capturing device 1. Specifically, in this example, the instruction data sets a maximum display resolution (horizontal size W ' and vertical size H' in FIG. 16A) of the smart phone 5. The acceptance unit 52 is implemented by the touch panel 521, and the instructions of the CPU 501. The microphone 514 may be used, in case the user operation is received as voice.

The video decoder 53a decodes each data of the low-definition, whole video image and the high-definition, partial video image encoded by the video encoder 20a. The still image decoder 53b decodes data of the ultra-high-definition, partial still image, encoded by the still image encoder 20b. The video decoder 53a and the still image decoder 53b may be implemented by the instructions of the CPU 501.

The superimposed area generator 54 specifies a superimposed area as indicated by the partial image parameters. The superimposed area indicates a location and a range of an area of the spherical image CE (whole video image), on which a superimposed image S (partial video image or partial still image) and a mask image M are superimposed. The superimposed area indicates both a location and a range of a superimposed image S (that is, partial video image or partial still image) and a mask image M on the spherical image CE (that is, whole image).

The image generator 55 generates the superimposed image S and the mask image M, which is to be superimposed on the superimposed area, and generates a spherical image CE from the low-definition, whole image.

The image superimposing unit 56 superimposes the superimposed image S and the mask image M, on the superimposed area of the spherical image CE, to generate the spherical image CE.

The projection converter 57 converts projection of the spherical image CE, from equirectangular projection to perspective projection, according to instruction data generated based on a user operation received at the acceptance unit 52. The projection converter 57 is implemented by the instructions of the CPU 501.

The display control 58 controls the display 517 to display the viewable-area image Q of the spherical image CE that is converted to have a perspective projection. The display control 58 is implemented by the instructions of the CPU 501, which controls operation of the display 517.

<Functional Configuration of Image Management Server>

Figure 15:
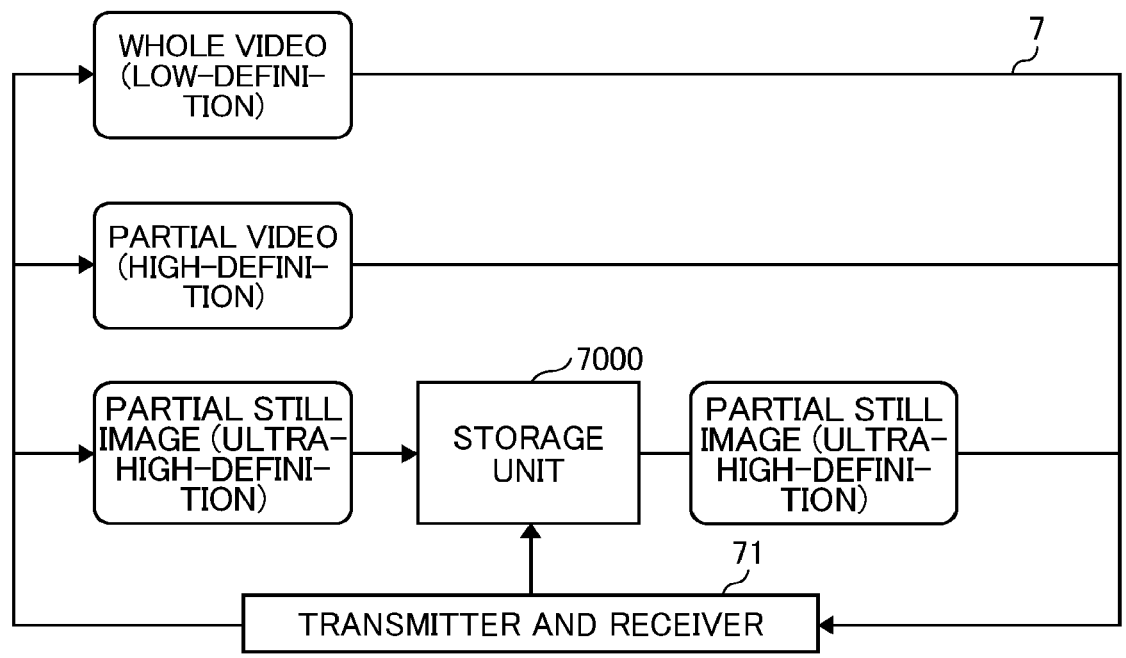
FIG. 15 is a schematic block diagram illustrating a functional configuration of the image management server of FIG. 8, according to the embodiment.

FIG. 15 is a diagram illustrating a functional configuration of the image management server 7 according to the embodiment. The image management server 7 includes a transmitter and receiver 71, which is implemented by the network I/F 709 illustrated in FIG. 12 and instructions of the CPU 701 according to the control program expanded from the HD 704 to the RAM 703. The image management server 7 further includes a storage unit 7000 implemented by the HD 704.

Next, referring to FIG. 15, a functional configuration of the image management server 7 is described in detail.

The transmitter and receiver 71 transmits or receives data to or from an extraneous source. For example, the transmitter and receiver 71 receives image data from the transmitter and receiver 11 of the spherical image capturing device 1 via the relay device 3, or transmits instruction data to the transmitter and receiver 11 of the spherical image capturing device 1 via the relay device 3. The transmitter and receiver 71 transmits the image data (video data of whole image and partial image illustrated in FIG. 20) and the partial image parameters, which is received from the transmitter and receiver 11 of the spherical image capturing device 1, to the smart phone 5. The transmitter and receiver 71 temporarily stores the ultra-high-definition still image, received from the spherical image capturing device 1 via the relay device 3, in the storage unit 7000. The transmitter and receiver 71 further reads the high-definition partial still image from the storage unit 7000 for transmission to the smart phone 5.

<Operation>

Referring now to FIGS. 17 to 26, operation of capturing the image and displaying the image, performed by the image capturing system, is described according to the embodiment. The following describes the example case in which the smart phone 5 playbacks the whole video image and the partial video image based on data generated and transmitted by the spherical image capturing device 1, and the user requests to display one frame of the partial video image with higher resolution. In response to this request, the smart phone 5 displays the ultra-high-definition, partial still image.

<Generation and Playback of Whole Video Image and Partial Video Image>

Figure 17:
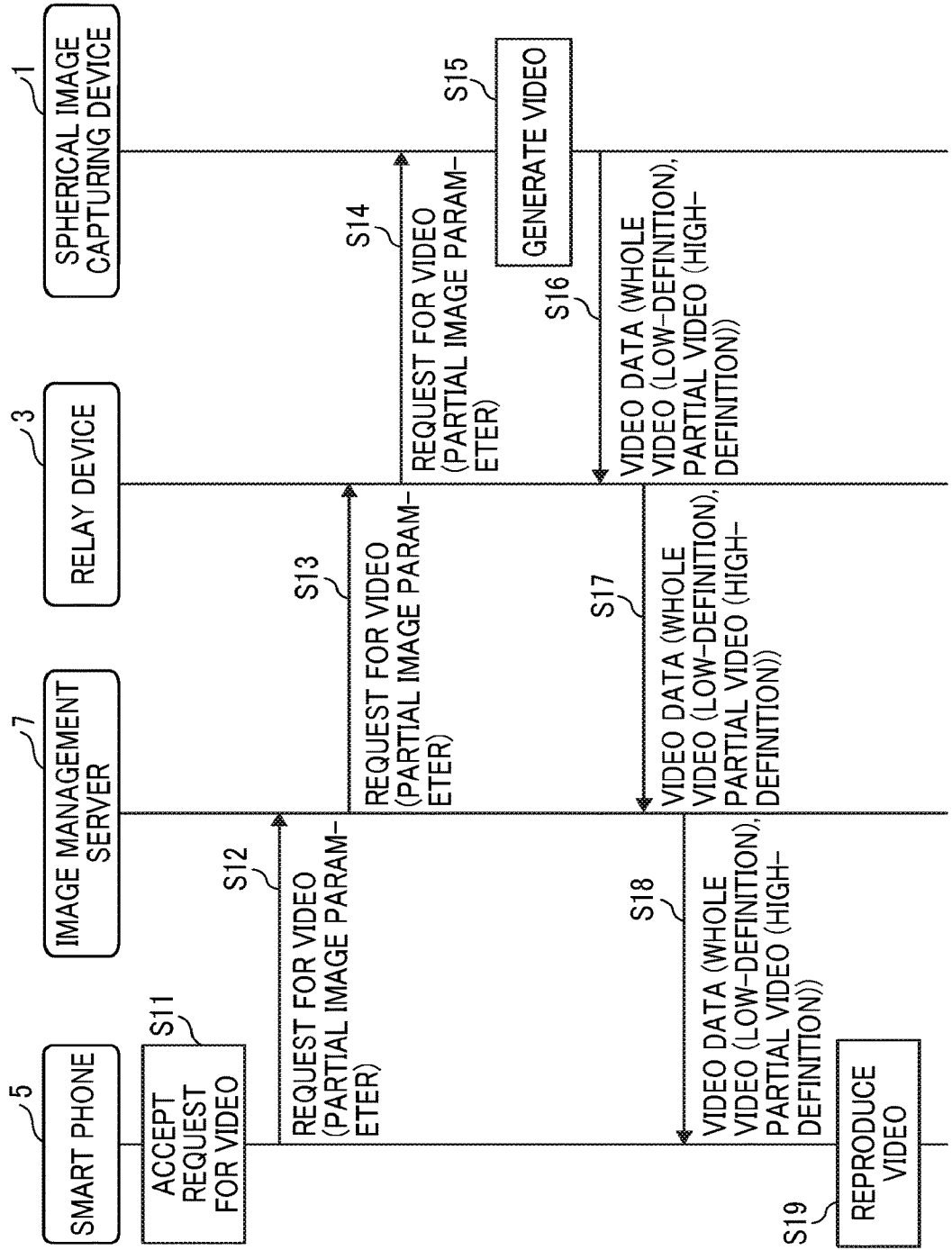
FIG. 17 is a sequence diagram illustrating operation of generating and reproducing a whole video image and a partial video image, according to the embodiment.

First, referring to FIG. 17, operation of generating and reproducing data of whole video image and partial video image is described according to the embodiment. FIG. 17 is a sequence diagram illustrating operation of generating and reproducing data of whole video image and partial video image according to the embodiment.

As illustrated in FIG. 17, the acceptance unit 52 of the smart phone 5 accepts a request to start distribution of video from a user as a viewer (S11). The transmitter and receiver 51 of the smart phone 5 transmits a request for video data, to the transmitter and receiver 71 of the image management server 7 (S12). With the request for video data, the smart phone 5 transmits the instruction data including the partial image parameters, designated by the user.

For example, the smart phone 5 may display the spherical image on which the partial image is being superimposed on at least a part of the spherical image. An area of the spherical image to be displayed in the view area may be set by default. In such case, the user may select a certain point of the spherical image being displayed, for example, by touching that point with a pointing device or a user's finger. In response to such user operation, the smart phone 5 transmits information on partial image parameters (for example, as instruction data) to the spherical image capturing device 1.

Next, the transmitter and receiver 71 of the image management server 7 transfers a request for video data to the transmitter and receiver of the relay device 3 (S13). The transmitter and receiver of the relay device 3 transfers a request for video data to the transmitter and receiver 11 of the spherical image capturing device 1 (S14).

The spherical image capturing device 1 generates video data (S15). This processing of S15 will be described later in detail (see FIGS. 18 to 20).

The transmitter and receiver 11 of the spherical image capturing device 1 transmits video data to the transmitter and receiver of the relay device 3 according to the request for video data (S16). This video data includes a set of low-definition, whole video image and high-definition, partial video image. The transmitter and receiver of the relay device 3 transfers the video data to the transmitter and receiver 71 of the image management server 7 (S17). The transmitter and receiver 71 of the image management server 7 transfers the video data to the transmitter and receiver 51 of the smart phone 5 (S18).

Next, the smart phone 5 playbacks the video data (S19). This processing of S19 will be described later in detail (see FIGS. 21 to 25).

<Generation of Video Data>

Next, referring to FIGS. 18 to 20, operation of generating video data, performed by the spherical image capturing device 1, at S15 is described according to the embodiment. FIG. 18 is a conceptual diagram for illustrating image processing performed by the spherical image capturing device 1, and images generated along with processing, according to the embodiment.

The image processor 15 combines (stiches) data of two hemispherical images obtained by the image capturing units 14a and 14b into data of an equirectangular projection image (in this example, video) in equirectangular projection (S120). The data of equirectangular projection video image, which is an ultra-high-definition image, is temporarily stored in the storage unit 16.

The partial image parameter generator 12 generates partial image parameters based on the instruction data sent from the smart phone 5 (S130). As described above, the instruction data includes information on an imaging direction, angle of view, aspect ratio of a partial image (a part of the whole image), and an image size for data transmission. As described below, the partial image parameters specify an area of the equirectangular projection image, on which the partial image is to be superimposed. The partial image parameters are generated based on the imaging direction and the angle of view, for example.

The image definition converter 17 converts the equirectangular projection image from an ultra-high-definition video image to a low-definition video image, according to instruction data from the smart phone 5 received at the transmitter and receiver 11 (S140). Accordingly, the low-definition, equirectangular projection video image (whole video image) is generated.

For each frame of video, the projection converter 18 applies projection transformation to an area of the equirectangular projection image, which corresponds to the partial image, to convert from the equirectangular projection to the perspective projection, according to the instruction data received at the transmitter and receiver 11 (S150). The area as the partial image is defined by the instruction data received at the transmitter and receiver 11 from the smart phone 5, which includes an imaging direction of an area of the whole video image, an angle of view and an aspect of such area, and a size of the partial image for transmission. Accordingly, the high-definition, partial video image is generated.

The combiner 19 combines the low-definition, whole video image and the high-definition, partial video image (S160). This process of combining images will be described below in detail (FIG. 20).

Referring to FIGS. 19 and 20, the above-described processing of FIG. 18 is described in detail. FIG. 19 is an illustration for explaining parameters of a partial image.

(Partial Image Parameter)

Referring to FIG. 19, partial image parameters are described in detail. FIG. 19A illustrates the whole image, after the images are combined (synthesized) at S120. FIG. 19B is a diagram illustrating an example of partial image parameters. FIG. 19C illustrates the partial image, to which the projection transformation is applied at S150.

The azimuth angle (aa) in FIG. 7 corresponds to the horizontal direction (latitude λ) in the equirectangular projection image illustrated in FIG. 19A. The elevation angle (ea) in FIG. 7 corresponds to the vertical direction (longitude φ) in the equirectangular projection image illustrated in FIG. 19A. The partial image parameters of FIG. 19B define an area in the equirectangular projection image, as the partial image. Specifically, as illustrated in FIG. 16B and FIG. 7, the partial image parameters include the point of gaze (aa, ea) as the central point CP, the angle of view α, and the aspect ratio of the horizontal length (w) and vertical length (h). With the partial image parameters, a specific area in the equirectangular projection image as the partial image can be defined. FIG. 19C illustrates an example partial image obtained by cutting out an area, surrounded by a frame in the equirectangular projection image in FIG. 19A that is defined by the partial image parameters.

The following describes transformation of a projection in detail. As illustrated in FIG. 4A, the equirectangular projection image EC covers a surface of the sphere CS, to generate the spherical image CE illustrated in FIG. 4B. Therefore, each pixel in the equirectangular projection image EC corresponds to each pixel in the surface of the sphere CS, that is, the three-dimensional, spherical image. The projection converter 18 applies the following transformation equation 3. Here, the coordinate system used for the equirectangular projection image EC is expressed with (latitude, longitude)=(ea, aa), and the rectangular coordinate system used for the three-dimensional sphere CS is expressed with (x, y, z).

$$(x,y,z)=(\cos(ea)\times\cos(aa),\cos(ea)\times\sin(aa),\sin(ea)),$$
wherein the sphere $CS$ has a radius of 1. (Equation 3)

The partial image in perspective projection, is a two-dimensional image. When the partial image is represented by the two-dimensional polar coordinate system (moving radius, argument)=(r, a), the moving radius r, which corresponds to the diagonal angle of view α, has a value in the range from 0 to tan (diagonal angle view/2). That is, 0<=r<=tan(diagonal angle view/2). The partial image, which is represented by the two-dimensional rectangular coordinate system (u, v), can be expressed using the polar coordinate system (moving radius, argument)=(r, a) using the following conversion equation 4.

$$u=r\times\cos(a), v=r\times\sin(a) \qquad \text{(Equation 4)}$$

The equation 4 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 5 and 6. Here, the equirectangular projection image is represented by the above-described two-dimensional polar coordinate system (moving radius, argument)=(r, a), and the virtual camera IC is located at the center of the sphere.

$$r=\tan(\text{polar angle}) \qquad \text{(Equation 5)}$$

$$a=\text{azimuth} \qquad \text{(Equation 6)}$$

Assuming that the polar angle is t, Equation 5 can be expressed as: t=arctan(r).

Accordingly, the three-dimensional polar coordinate (moving radius, polar angle, azimuth) is expressed as (1,arctan(r),a).

The three-dimensional polar coordinate system is transformed into the rectangle coordinate system (x, y, z), using Equation 7.

$$(x,y,z)=(\sin(t)\times\cos(a),\sin(t)\times\sin(a),\cos(t)) \qquad \text{(Equation 7)}$$

Equation 7 is applied to convert between the equirectangular projection image EC (whole image) in equirectangular projection, and the partial image in perspective projection. More specifically, the moving radius r, which corresponds to the diagonal angle of view α of the partial image, is used to calculate transformation map coordinates, which indicate correspondence of a location of each pixel between the partial image and the equirectangular projection image EC. With this transformation map coordinates, the equirectangular projection image EC is transformed to generate the partial image in perspective projection.

Through the above-described projection transformation, the coordinate (latitude=90°, longitude=0°) in the equirectangular projection image EC becomes the central point in the partial image in perspective projection. In case of applying projection conversion to an arbitrary point in the equirectangular projection image EC as the point of gaze, the sphere CS covered with the equirectangular projection image EC is rotated such that the coordinate (latitude, longitude) of the point of gaze is positioned at (90°, 0°).

The sphere CS may be rotated using any known equation for rotating the coordinate.

(Combining Images)

Referring to FIG. 20, example operation of combining images, performed by the combiner 19 at S160, is described. FIG. 20 is a conceptual diagram of data, generated by combining a frame of the whole video image and a corresponding frame of the partial video image. As illustrated in FIG. 20, a set of frames of video images are combined, such that a frame of the whole video image is arranged at an upper side, and a frame of the partial video image is arranged at a lower side. In this embodiment, the images are arranged to have an aspect ratio of 16:9, which is generally used for high-definition (HD) TV, but any other aspect ratio may be used. Further, the arrangement of these two images is not limited to the upper and lower sides, but may be left and right sides. When there are a plurality of partial video images, the frame of the whole video may be positioned at upper half, and the frames of the partial video images may be positioned at lower half, while the lower half area being divided into areas in a number of partial video images being present. By combining the whole image and the partial image(s) into one item of data, it would be easier to manage images to be combined (stitched), or images to be synchronized for display at substantially the same time. Alternatively, the spherical image capturing device 1 may transmit the whole image data and the partial image data to the smart phone 5 separately, or at different timings, as long as they are associated to be displayed as one image.

In case the whole video image and the partial video image are to be transmitted as one data item as illustrated in FIG. 20, resolution of each image will be reduced, as a vertical size is reduced by half. Accordingly, the whole video image and the partial video image are both lower in definition than that of the ultra-high-definition video image stored at the storage unit 16. That is, image definition will be higher in the order from the ultra-high-definition video image stored in the storage unit 16, the partial video image output from the projection converter 18, and the whole video image output from the image definition converter 17.

<Playback of Video at Smart Phone>

Figure 21:
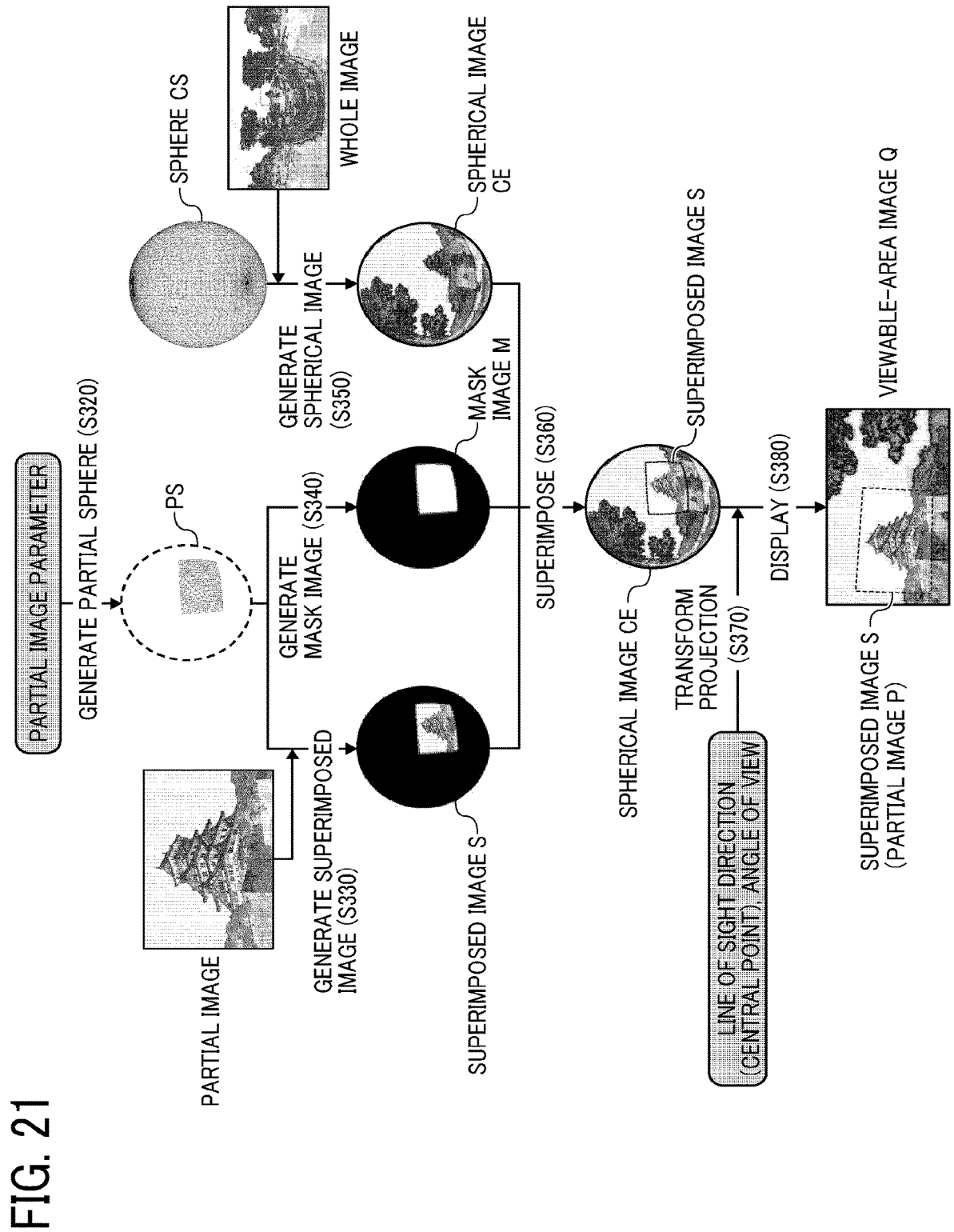
FIG. 21 is a conceptual diagram illustrating image processing performed by the smart phone, with images being generated, according to the embodiment.

Referring to FIG. 21, operation of reproducing video at the smart phone 5 is described according to the embodiment. FIG. 21 is a conceptual diagram for illustrating image processing performed by the smart phone 5, and images generated along with processing, according to the embodiment.

The superimposed area generator 54 illustrated in FIG. 14 generates a partial sphere PS, indicated by partial image parameters, as illustrated in FIG. 21 (S320).

The image generator 55 superimposes the partial image in perspective projection, on the partial sphere PS to generate the superimposed image S (S330). The image generator 55 further generates the mask image M, based on a surface area of the partial sphere PS (S340). The image generator 55 covers (attaches) the whole image in equirectangular projection (equirectangular projection image EC), over the sphere CS, to generate the spherical image CE (S350). The image superimposing unit 56 superimposes the superimposed image S and the mask image M, on the spherical image CE (S360). The image is generated, in which the high-definition superimposed image S (high-definition partial image) is superimposed on the low-definition spherical image CE (low-definition whole image). With the mask image, the boundary between the two different images is made unnoticeable.

The projection converter 57 converts projection (S370), such that the viewable area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the viewable area T), and the angle of view α of the viewable area T. Accordingly, the display control 58 controls the display 517 to display the viewable-area image Q, which is a viewable area T of the spherical image CE.

Figure 22B:
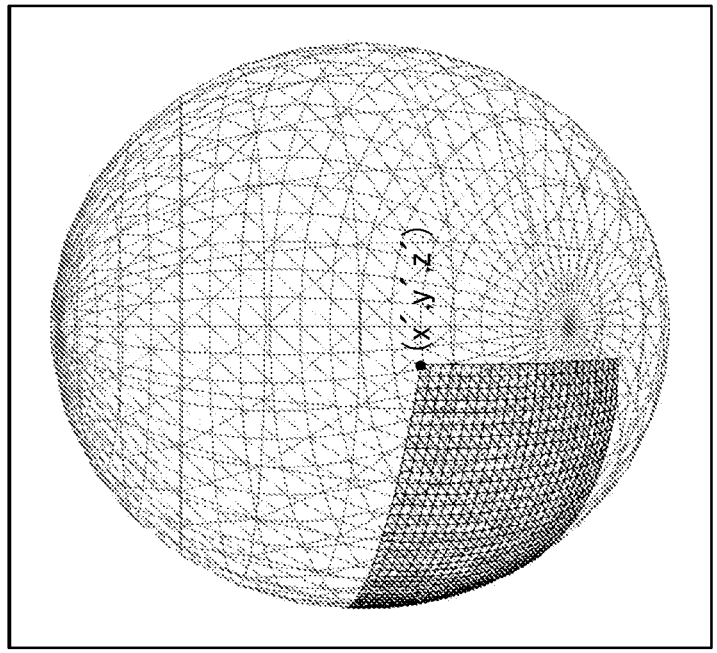
FIGS. 22A and 22B (FIG. 22) are an illustration for explaining generation of a partial sphere, from a partial image, according to the embodiment.
Figure 22A:
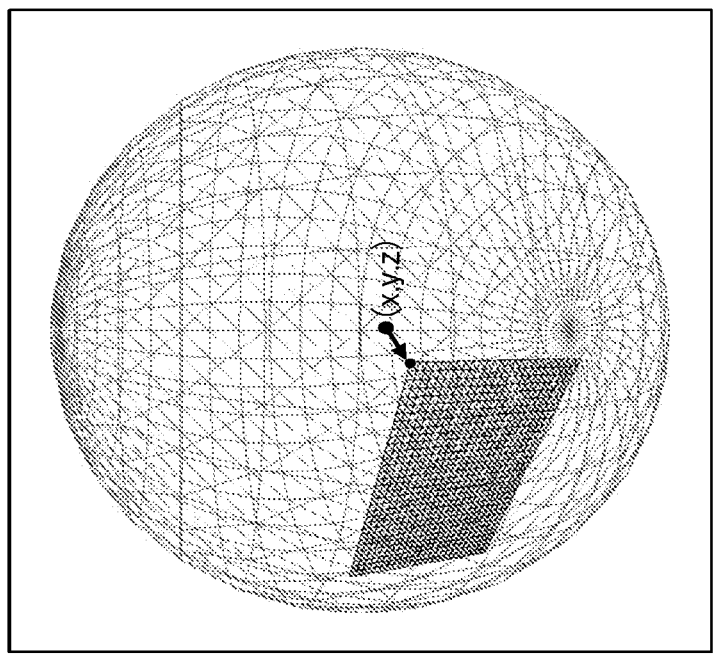

FIG. 22 is an illustration for explaining generation of a partial sphere, from a partial image that is a planar image. In general, since an image is projected onto a plane in perspective projection, the image is often represented as a planar image in a three-dimensional space as illustrated in FIG. 22A. In the present embodiment, as illustrated in FIG. 22B, the image is represented as a partial sphere, which is a part of a sphere representing the spherical image. The following describes transformation from a planar image (FIG. 22A) to a partial sphere (FIG. 22B).

As illustrated in FIG. 22A, it is assumed that each point (x, y, z) on a plane having a certain angle of view is projected onto a surface of the sphere. The point, where a straight line that connects the origin of the sphere ("Center") and each point (x, y, z), intersects the surface of the sphere, is considered as the point (x', y', z') on the surface of the sphere illustrated in FIG. 17B. Each point on the surface of the sphere is a point whose distance from the origin is equal to the radius of the sphere. If the radius of the sphere is 1, the point (x', y', z') on the surface of the sphere illustrated in FIG. 22B is expressed by the Equation 8.

$$(x',y',z')=(x,y,z)\times 1/\sqrt{(x2+y2+x2)} \quad \text{(Equation 8)}$$

Figure 23A:
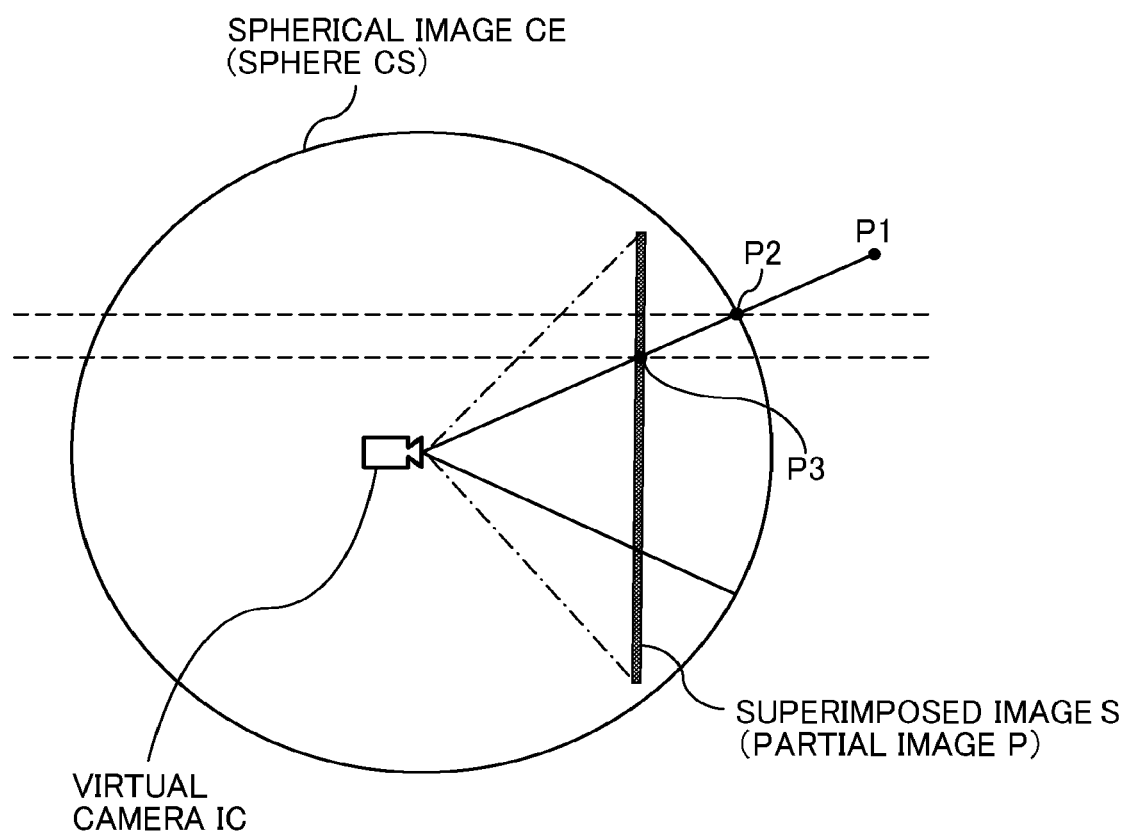
FIGS. 23A and 23B (FIG. 23) are conceptual diagrams illustrating a two-dimensional view of a spherical image superimposed with a partial image, without generating the partial sphere, according to a comparative example.
Figure 23B:
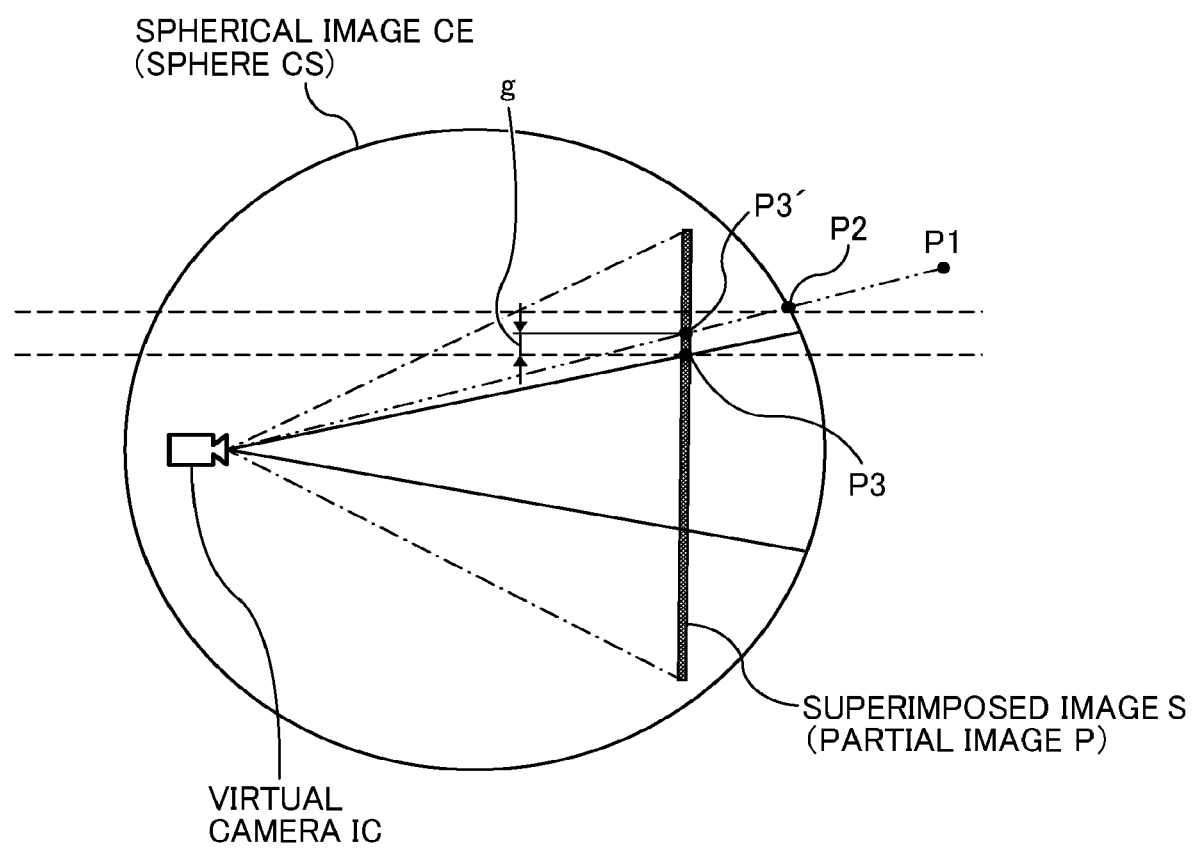
Figure 24A:
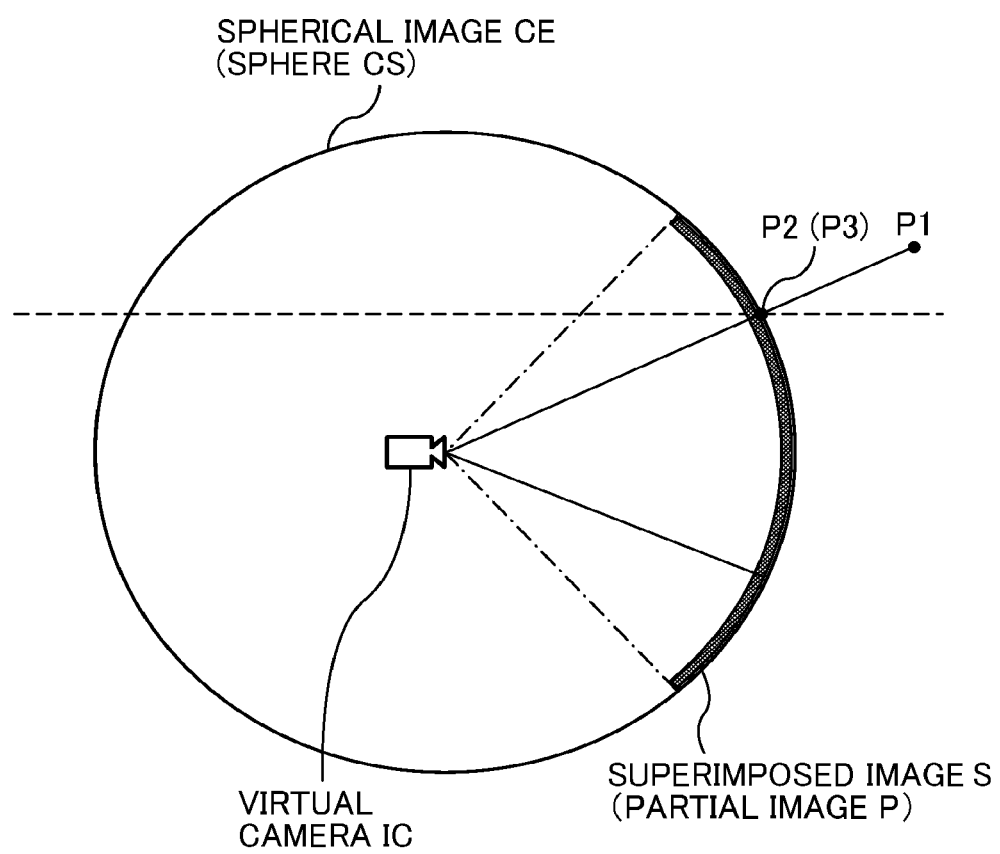
FIGS. 24A and 24B (FIG. 24) are conceptual diagrams illustrating a two-dimensional view of the spherical image superimposed with the partial image, while generating the partial sphere, according to the embodiment.
Figure 24B:
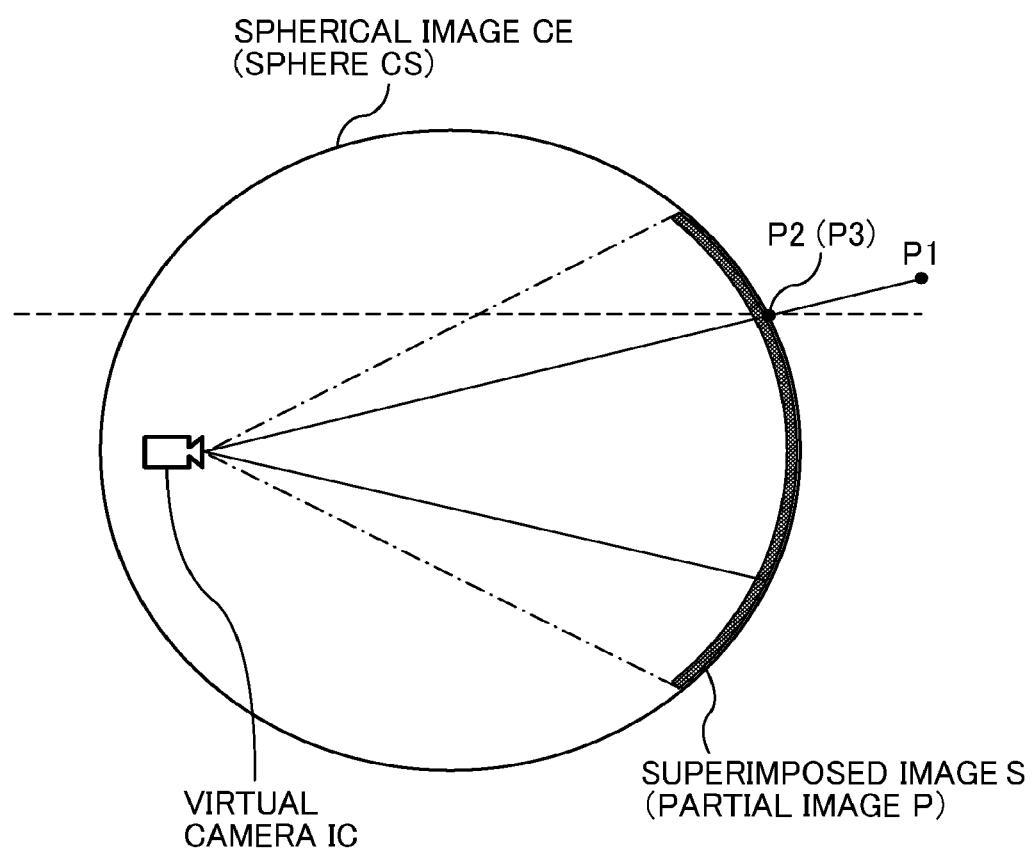

FIGS. 23A and 23B are conceptual diagrams illustrating a two-dimensional view of a spherical image CE superimposed with a partial image P, without generating the partial sphere, according to a comparative example. FIGS. 24A and 24B are conceptual diagrams illustrating a two-dimensional view of the spherical image CE superimposed with the partial image P, while generating the partial sphere, in this embodiment.

As illustrated in FIG. 23A, it is assumed that the virtual camera IC, which corresponds to the user's point of view, is located at the center of the sphere CS, which is a reference point. The object P1, as an image capturing target, is represented by the object P2 in the spherical image CE. The object P1 is represented by the object P3 in the superimposed image S. Still referring to FIG. 23A, the object P2 and the object P3 are positioned along a straight line connecting the virtual camera IC and the object P1. This indicates that, even when the superimposed image S is displayed as being superimposed on the spherical image CE, the coordinate of the spherical image CE and the coordinate of the superimposed image S match. As illustrated in FIG. 18B, if the virtual camera IC is moved away from the center of the sphere CS, the position of the object P2 stays on the straight line connecting the virtual camera IC and the object P1, but the position of the object P3 is slightly shifted to the position of an object P3'. The object P3' is an object in the superimposed image S, which is positioned along the straight line connecting the virtual camera IC and the object P1. This will cause a difference in grid positions between the spherical image CE and the superimposed image S, by an amount of shift "g" between the object P3 and the object P3'. Accordingly, in displaying the superimposed image S, the coordinate of the superimposed image S is shifted from the coordinate of the spherical image CE.

With the partial sphere being generated, as illustrated in FIGS. 24A and 24B, the superimposed image S is superimposed on the spherical image CE at right positions, while compensating the shift. More specifically, as illustrated in FIG. 24A, when the virtual camera IC is at the center of the sphere CS, the object P2 and the object P3 are positioned along the straight line connecting the virtual camera IC and the object P1. As illustrated in FIG. 19B, even when the virtual camera IC is moved away from the center of the sphere CS, the object P2 and the object P3 are positioned along the straight line connecting the virtual camera IC and the object P1. Even when the superimposed image S is displayed as being superimposed on the spherical image CE, the coordinate of the spherical image CE and the coordinate of the superimposed image S match.

Figure 25A:
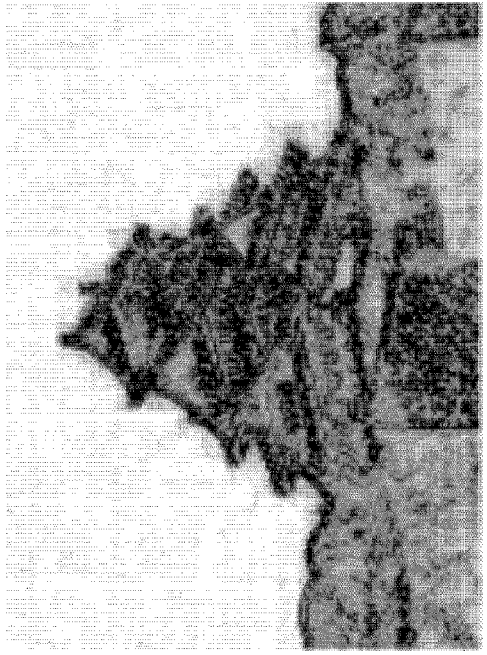
FIGS. 25A, 25B, 25C, and 25D (FIG. 25) are illustrations of a wide-angle image without superimposed display, a telephoto image without superimposed display, a wide-angle image with superimposed display, and a telephoto image with superimposed display, according to the embodiment.
Figure 25B:
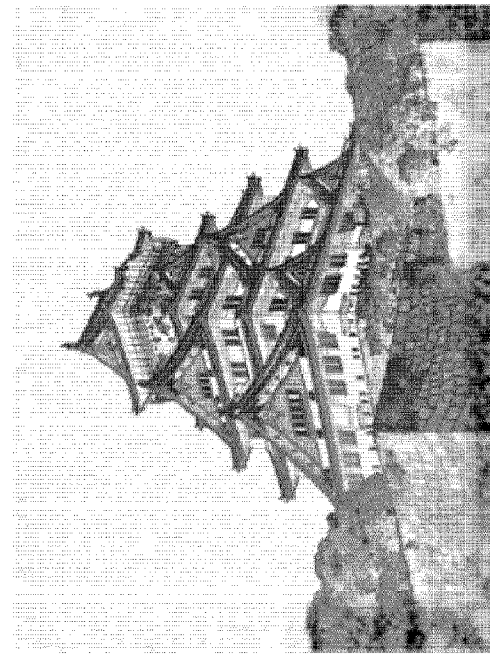
Figure 25C:
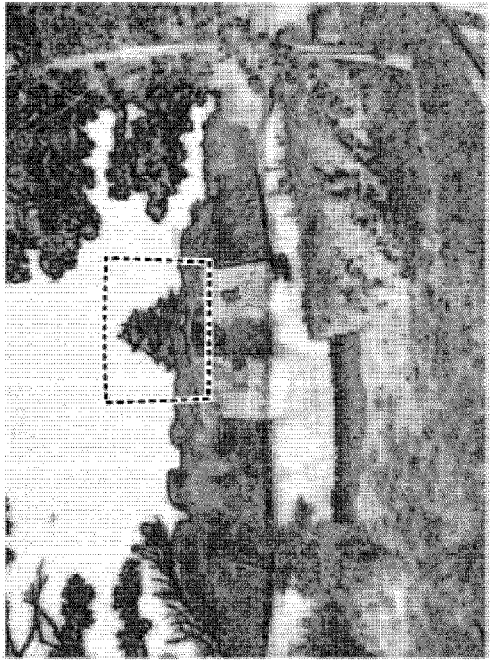
Figure 25D:
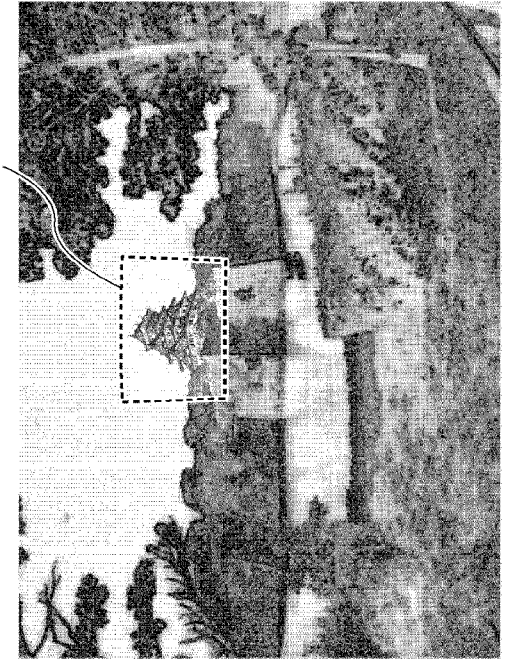

FIG. 25A illustrates the spherical image CE (low-definition whole image), when displayed as a wide-angle image. Here, the partial image P (high-definition partial image) is not superimposed on the spherical image CE. FIG. 25B illustrates the spherical image CE, when displayed as a telephoto image. Here, the partial image P is not superimposed on the spherical image CE. FIG. 25C illustrates the spherical image CE, superimposed with the partial image P, when displayed as a wide-angle image. FIG. 25D illustrates the spherical image CE, superimposed with the partial image P, when displayed as a telephoto image. The dotted line in each of FIGS. 25A and 25C, which indicates the boundary of the partial image P, is shown for the descriptive purposes. Such dotted line may be displayed, or not displayed, on the display 517 to the user. Further, it is assumed that the images illustrated in FIGS. 25A to 25D are displayed as video.

It is assumed that, while the spherical image CE without the partial image P being superimposed, is displayed as illustrated in FIG. 25A, a user instruction for enlarging an area indicated by the dotted area is received. In such case, as illustrated in FIG. 25B, the enlarged, low-definition image, which is a blurred image, is displayed to the user. As described above in this embodiment, it is assumed that, while the spherical image CE with the partial image P being superimposed, is displayed as illustrated in FIG. 25C, a user instruction for enlarging an area indicated by the dotted area is received. In such case, as illustrated in FIG. 25D, a high-definition image, which is a clear image, is displayed to the user. However, even when the high-definition image is being displayed, the user may still want to see details of such specified area.

For example, assuming that the target object, which is shown within the dotted line, has a sign with some characters, even when the user enlarges that section, the user may not be able to read such characters if the image is low in resolution. If the partial image of even higher resolution is displayed on that section, the user is able to read those characters. As described below, the smart phone 5 displays the ultra-high-definition, partial still image, in response to user operation for requesting display of such image. Examples of such user operation include, but not limited to, any operation for specifying an area of the user's interest, from the view area, for example, by using the pointing device such as a mouse or user's finger(s).

<Generation and Display of Partial Still Image>

Next, referring to FIG. 26, operation of generating and reproducing data of partial still image is described according to the embodiment. FIG. 26 is a sequence diagram illustrating operation of generating and reproducing data of a partial still image according to the embodiment.

At S19 of FIG. 17, the smart phone 5 displays to the viewer (user) video of whole image, on which the partial video image is superimposed, as illustrated in FIG. 25C. The user, who is viewing the video, may want to see a part of the whole image in more detail. In such case, the user may operate the smart phone 5 to request for displaying a specific part in more detail, for example, by zooming in a specific part in the whole image being displayed. In response to such request, the smart phone 5 displays an ultra-high-definition partial still image, which is higher in image definition than that of the high-definition partial video image, to the user. In operation, as illustrated in FIG. 26, the acceptance unit 52 of the smart phone 5 accepts a request to start distribution of a partial still image from the viewer (user) (S31). The transmitter and receiver 51 of the smart phone 5 transmits a request for still image data, to the transmitter and receiver 71 of the image management server 7 (S32). With the request for still image data, the smart phone 5 transmits the instruction data including the partial image parameters, designated by the viewer.

Next, the transmitter and receiver 71 of the image management server 7 transfers a request for still image data to the transmitter and receiver of the relay device 3 (S33). The transmitter and receiver of the relay device 3 transfers a request for still image data to the transmitter and receiver 11 of the spherical image capturing device 1 (S34).

The spherical image capturing device 1 generates still image data (S35). The processing of S35 will be described later in detail.

The transmitter and receiver 11 of the spherical image capturing device 1 transmits still image data to the transmitter and receiver of the relay device 31 according to the request for still image data (S36). The still image data is data of an ultra-high-definition, partial still image.

The transmitter and receiver of the relay device 3 transfers the still image data to the transmitter and receiver 71 of the image management server 7 (S37).

Next, the transmitter and receiver 71 of the image management server 7 temporarily stores the still image data in the storage unit 7000 (S38).

The transmitter and receiver 71 of the image management server 7 transfers the still image data to the transmitter and receiver 51 of the smart phone 5 (S39). The transmitter and receiver 71 of the image management server 7 transfers the still image data to the transmitter and receiver 51 of the smart phone 5 (S39).

The smart phone 5 displays, on the display 517, the ultra-high-definition, partial still image, in place of the high-definition partial video image being superimposed on the whole video image (S40). This operation of superimposing the partial still image on the whole video image is partly in common to the above-described operation of superimposing the partial video image on the whole video image, with some differences that will be described below.

At S35, when the determiner 25 determines not to apply projection transformation on the ultra-high-definition, still image, at the projection converter 18, the determiner 25 may cause a message to be displayed to the user, for example, at S36 and S37. Such message may be "still image is not transmitted" or "angle of view is too narrow". In such case, the whole video image, on which the partial video image is superimposed, is continuously displayed, with the above-described message.

<Generation of Still Image>

Next, operation of generating a still image, performed by the spherical image capturing device 1, at S35 is described according to the embodiment.

In response to receiving a request for still image data, the spherical image capturing device 1 determines whether to generate a partial still image. When the angle of view of the partial image is relatively narrow, even when the partial still image, which is higher in resolution than that of the partial video image, is displayed, the user is not able to see the differences in resolution. For this reasons, when the angle of view, specified by the instruction data, is narrower than the threshold of angle of view, the partial still image is not generated. In this embodiment, when an angle of view defined by the partial image parameters, is greater than the threshold value of horizontal angle of view (AH) or vertical angle of view (AV) in FIG. 16, the spherical image capturing device 1 generates an ultra-high-definition, partial still image (S210).

More specifically, while the transmitter and receiver 11 of the spherical image capturing device 1 is transmitting video data, it is assumed that the request for still image data is received. In such case, the projection converter 18 applies projection transformation to an area, cut out from the equirectangular projection image, according to partial image parameters, to generate a partial still image. Here, resolution of the partial still image is unchanged from the ultra-high-definition, equirectangular projection image (whole image) stored in the storage unit 16. A size of the partial still image may be changeable. When the horizontal resolution of the ultra-high-definition, whole image is W, and the horizontal angle of view specified by the instruction data is ah, the horizontal resolution Wp of the partial still image can be calculated as follows.

$$Wp = W/360 * ah \qquad \text{(Equation 9)}$$

The spherical image capturing device 1 reads out the value of W, from the information on threshold value of an angle of view that is stored in the threshold manager 1001 (See FIG. 16A).

Similarly, when the vertical resolution of the ultra-high-definition, whole image is H, and the vertical angle of view specified by the instruction data is av, the vertical resolution Hp of the partial still image can be calculated as follows.

$$Hp = H/180 * av \qquad \text{(Equation 10)}$$

The still image encoder 20b encodes the partial still image data, and stores the encoded data in an image buffer. The transmitter and receiver 11 transmits the partial still image data to the image management server 7 via the relay device 3, in a substantially similar manner as described above referring to S16 and S17. The partial image parameters are sent with the partial still image data.

<Display of Still Image>

Next, operation of reproducing a still image, performed by the smart phone 5 at S40, is described according to the embodiment.

The transmitter and receiver 51 of the smart phone 5 separates the still image data, received from the spherical image capturing device 1, into data of partial still image and partial image parameters. The still image decoder 53b decodes the partial still image, extracted from the still image data. The processing of displaying the partial still image in a manner that is superimposed on the whole video image is performed in a substantially similar manner as described above referring to S19 of FIG. 17 and FIG. 21.

As described above, according to one or more embodiments, an amount of data of whole video image and partial video image to be transmitted via a network is reduced. Specifically, in one example, the partial video image is generated to have an image definition lower than that of the equirectangular projection image that has been generated by capturing an object. The user, who views the video image, is not likely to look closely to the partial video image, even when the partial video image may contain an object that the user may become interested. That is, as long as the partial video image is sufficiently clear, its resolution may be lowered.

In case there is a request from a user to display a specific area in more detail, such area of user's interest can be displayed with higher resolution as an ultra-high-definition, partial still image.

Specifically, as described above, the spherical image capturing device 1 generates a low-definition, whole image (in this example, the low-definition, whole video image) from an ultra-high-definition, spherical image (S140). The spherical image capturing device 1 further generates a high-definition, partial image (in this example, the high-definition, partial video image) in different projection, from the same ultra-high-definition, spherical image (S150). The spherical image capturing device 1 transmits data of the low-definition, whole image and the high-definition, partial image, to the smart phone 5. The smart phone 5 superimposes the high-definition, partial image, on the low-definition, whole image (S360), and converts projection of the superimposed image according to the line-of-sight direction and the angle of view specified by the user (viewer) (S370). As described above, the spherical image capturing device 1, which obtains an ultra-high-definition, spherical image of an object, transmits a partial image having an area of interest as a high-definition image, and a whole image that shows an entire image as a low-definition image. The spherical image capturing device 1 further converts projection of the high-definition partial image, before transmission of such image. Further, the combiner 19 of the spherical image capturing device 1 combines a frame of the low-definition whole video image and a frame of the high-definition partial video image into one frame, while lowering resolution of each image, as described above referring to FIG. 20.

Accordingly, the smart phone 5, which receives image data having a reduced data size, is able to display the spherical image on which the partial image is superimposed on the whole image, with increased processing speed.

Further, even when the low-definition whole image and the high-definition partial image (or the ultra-high-definition partial image) are generated in different projections (projective spaces), projection of the high-definition partial image (or the ultra-high-definition partial image) has been converted before being transmitted. Accordingly, the smart phone 5 is able to combine these images, without requiring projection transformation.

Further, in the above-described embodiment, the determiner 25 determines whether an entire frame of the partial image, which is an area cut out from the whole image, is smaller than an area determined by the threshold value of angle of view, managed by the threshold manager 1001 as illustrated in FIG. 16. When the partial image is smaller than the area determined by the threshold angle of view, the determiner 25 controls the projection converter 18 not to generate the ultra-high-definition, partial still image. When the partial image is equal to or greater than the area determined by the threshold angle of view, the determiner 25 controls the projection converter 18 to generate the ultra-high-definition, partial still image.

In alternative to this processing of controlling to generate or not to generate the ultra-high-definition, partial still image, the determiner 25 may control the transmitter and receiver 11 to transmit or not to transmit the ultra-high-definition, partial still image. More specifically, when the partial image is smaller than the area determined by the threshold angle of view, the determiner 25 controls the transmitter and receiver 11 not to transmit the ultra-high-definition still image, stored in the still image storage unit 29. When the partial image is equal to or greater than the area determined by the threshold angle of view, the determiner 25 controls the transmitter and receiver 11 to transmit the ultra-high-definition still image, stored in the still image storage unit 29, to the smart phone 5.

In the above-described case, the determiner 25 may instruct the transmitter and receiver 11 to transmit or not to transmit the partial still image. Alternatively, the determiner 25 may instruct the still image storage unit 29 to transmit or not to transmit the partial still image having the projection converted and stored therein.

Further, the above-described spherical image capturing device 1 illustrated in FIG. 1 is an example of image capturing device. Other examples of image capturing device include a digital camera or smart phone capable of capturing a wide-angle image using a wide-angle lens, for example.

The smart phone 5 illustrated in FIG. 8 is an example of a communication terminal capable of communicating with the image capturing device 1 either directly or indirectly to obtain images for display. Examples of the communication terminal include, but not limited to, a tablet personal computer (PC), note PC, desktop PC, smart watch, game machine, and car navigation system mounted on a vehicle. That is, as long as the communication terminal is capable of displaying images received from the image capturing device, any type of apparatus may be used.

Further, in the above-described embodiments, the image management server 7 is provided, which stores various data such as the ultra-high-definition partial still image generated by the image capturing device 1. However, use of the image management server 7 is optional.

Any one of the above-described functions performed by the image capturing device 1 may be performed by a combination of the image capturing device 1 and one or more servers on the communication network 100. For example, the image capturing device captures an object to generate an ultra-high-definition, equirectangular projection image (spherical image). Any one of processing such as generation of a low-definition whole video image, a high-definition partial video image, and an ultra-high-definition partial still image may be performed, for example, at the server.

In any one of the above-described embodiments, the whole image generated from image data captured at the image capturing units 14a and 14b, is referred to as a low-definition image (video). The partial image, as a part of the whole image, is referred to as a high-definition image (video). The high-definition image and the low-definition image are not limited to this example. The low-definition image may be an image (video) of a partial area of the whole image generated from the image data captured at the image capturing units 14a and 14b. In such case, the high-definition image is an image (video) of a partial area of the partial area in the whole image. That is, the low-definition video image is any video image having an angle of view larger than that of the high-definition video image. Accordingly, the low-definition video image may be called a wide-angle video image, and the high-definition video image may be called a narrow-angle video image. Similarly, the ultra-high definition still image may be called a narrow-angle still image.

In this disclosure, the wide-angle image (either still image or video image) is any image that has been captured at an image capturing device using a wide-angle lens or fish-eye lens, which may have image distortion. The narrow-angle image (either still image or video image) is any image, which corresponds to a part of the wide-angle image, having an angle of view less than that of the wide-angle image. That is, even though the term "whole" is used, the whole image may be a part of the captured image, or entire captured image. In such case, the high-definition image, which is the partial image, is an image of a part of the whole image, while the whole image being a part or entire captured image.

In any one of the above-described embodiments, the partial image, which is the planar image, is superimposed on the whole image, which is the spherical image. In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

Further, any one of the low-definition, whole image and the high-definition, partial image, may each be generated as any combination of a moving image and a still image. That is, both of the low-definition, whole image and the high-definition, partial image may be a moving image, or a still image. Either one of the whole image and the partial image may be a moving image, or a still image.

Further, in any one of the above-described embodiments, the projection converter 18 applies projection transformation to an area, cut out from the ultra-high-definition, spherical image that is read out from the storage unit 16, to generate a partial still image in different projection while keeping its resolution being unchanged. Alternatively, the projection converter 18 may apply projection transformation to an area, which is made lower in image definition than that of the spherical image stored in the storage unit 16, as long as the resultant partial still image is higher in image definition than any one of the low-definition, whole video image output from the image definition converter 17 and the high-definition, partial video image.

Further, in any one of the above-described embodiments, bandwidth control may be performed to control transmission of data over the communication network 100. Through this bandwidth control, data can be transmitted or received more stably. For example, at S12 of FIG. 17, the transmitter and receiver 51 of the smart phone 5 may control timing to start transmission of data according to the available bandwidth of the communication network 100. Similarly, at any one of S17 and S18 of FIG. 17 and S37 and S39 of FIG. 26, any one of the relay device 3 and the image management server 7 may control timing to start transmission of image data to cause a total transmission time will be shorter, for example, through bandwidth control. Examples of such bandwidth control include, but not limited to, sending data during when traffic of data is not heavy such as during the time, based on time that has been obtained by measuring a delay time.

Each of the functions of the described embodiments, such as the functions described above referring to FIGS. 13, 14, and 15 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), programmable logical circuit (PLD), discrete gate, transistor logical device, and conventional circuit components arranged to perform the recited functions. Further, any one of the above-described memories, or any device capable of storing data, may be implemented by, for example, a USB memory, flash memory, removable disc, ROM, RAM, magnetic disc, and optical disc.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. An image capturing device comprising:
an imaging device configured to capture a video image of an object; and
circuitry configured to:
convert a wide-angle video image from an ultra-high-definition image into a low definition image to generate a low-definition, wide-angle image, the wide-angle video image being an entire or a part of the captured video image;
apply projection transformation to a part of the wide-angle video image to generate a high-definition, narrow-angle video image in different projection, the high-definition, narrow-angle video image having an image definition higher than that of the low-definition, wide-angle video image;
combine each frame of the low-definition, wide-angle video image and a corresponding frame of the high-definition, narrow-angle video image, into one frame data while reducing a resolution of each video image, to generate a combined video image;
transmit the combined video image for display at a communication terminal, the high-definition, narrow-angle video image to be superimposed on the low-definition, wide-angle video image;
in response to a request from the communication terminal, apply projection transformation to a part of a frame of the wide-angle video image to generate an ultra-high-definition, narrow-angle still image in different projection, the ultra-high-definition, narrow-angle still image having an image definition higher than that of the high-definition, narrow-angle video image; and
transmit the ultra-high-definition, narrow-angle still image for display at the communication terminal, the ultra-high-definition, narrow-angle still image to be displayed in place of the high-definition, narrow-angle video image.

2. The image capturing device of claim 1, wherein the circuitry is further configured to
determine whether an area defined by the part of the frame of the wide-angle video image, from which the ultra-high-definition, narrow-angle still image is generated, is smaller than a predetermined area;
control not to generate the ultra-high-definition, narrow-angle still image, or not to transmit the ultra-high-definition, narrow-angle still image, based on a determination that the area of the wide-angle video image is smaller than the predetermined area.

3. The image capturing device of claim 2, wherein the area defined by the part of the frame of the wide-angle video image, from which the ultra-high-definition, narrow-angle still image is generated, is determined by instruction data transmitted with the request.

4. The image capturing device of claim 2, wherein the predetermined area is determined by a threshold value of angle of view.

5. The image capturing device of claim 1, wherein the ultra-high-definition, narrow-angle still image has an image definition equal to that of the wide-angle video image.

6. The image capturing device of claim 1, wherein the imaging device captures a spherical image of the object using at least two lenses.

7. The image capturing device of claim 1, further comprising:
a communication circuit configured to communicate with the communication terminal via a relay device,
wherein the image capturing device is mountable on the relay device.

8. An image capturing system comprising:
the image capturing device of claim 1; and
the communication terminal communicably connected with the image capturing device, comprising circuitry configured to:
obtain, from the combined video image, the high-definition, narrow-angle video image and the low-definition, wide-angle video image;
control a display to display the low-definition, wide-angle video image, on which the high-definition, narrow-angle video image is superimposed;
in response to an instruction, further control the display to display the ultra-high-definition, narrow-angle still image, in place of the high-definition, narrow-angle video image.

9. The image capturing system of claim 8, further comprising:
an image management server communicably connected with the image capturing device and the communication terminal, comprising:
circuitry configured to store, in a memory, the ultra-high-definition, narrow-angle still image, received from the image capturing device.

10. An image processing system comprising circuitry configured to:
obtain a video image of an object;
convert a wide-angle video image from an ultra-high-definition image into a low definition image to generate a low-definition, wide-angle image, the wide-angle video image being an entire or a part of the captured video image;
apply projection transformation to a part of the wide-angle video image to generate a high-definition, narrow-angle video image in different projection, the high-definition, narrow-angle video image having an image definition higher than that of the low-definition, wide-angle video image;
combine each frame of the low-definition, wide-angle video image and a corresponding frame of the high-definition, narrow-angle video image, into one frame data while reducing a resolution of each video image, to generate a combined video image;
control a display to display the combined video image, such that the high-definition, narrow-angle video image is superimposed on the low-definition, wide-angle video image;
in response to a request from a communication terminal, apply projection transformation to a part of a frame of the wide-angle video image to generate an ultra-high-definition, narrow-angle still image in different projection, the ultra-high-definition, narrow-angle still image having an image definition higher than that of the high-definition, narrow-angle video image; and
control the display to display the ultra-high-definition, narrow-angle still image in place of the high-definition, narrow-angle video image.

11. An image processing method comprising:
obtaining a video image of an object;
converting a wide-angle video image from an ultra-high-definition image into a low definition image to generate a low-definition, wide-angle image, the wide-angle video image being an entire or a part of the captured video image;
applying projection transformation to a part of the wide-angle video image to generate a high-definition, narrow-angle video image in different projection, the high-definition, narrow-angle video image having an image definition higher than that of the low-definition, wide-angle video image;
combining each frame of the low-definition, wide-angle video image and a corresponding frame of the high-definition, narrow-angle video image, into one frame data while reducing a resolution of each video image, to generate a combined video image;
transmitting the combined video image for display at a communication terminal, the high-definition, narrow-angle video image to be superimposed on the low-definition, wide-angle video image;
in response to a request from the communication terminal, applying projection transformation to a part of a frame of the wide-angle video image to generate an ultra-high-definition, narrow-angle still image in different projection, the ultra-high-definition, narrow-angle still image having an image definition higher than that of the high-definition, narrow-angle video image; and
transmitting the ultra-high-definition, narrow-angle still image for display at the communication terminal, the ultra-high-definition, narrow-angle still image to be displayed in place of the high-definition, narrow-angle video image.

* * * * *